US 7,757,928 B2

(12) United States Patent
Goenka et al.

(10) Patent No.: US 7,757,928 B2
(45) Date of Patent: Jul. 20, 2010

(54) SYSTEM AND METHOD FOR FORMING A CONTINUOUS STRIP/PLATE FROM A PLURALITY OF STRIPS/PLATES AND FOR FORMING A PIPE FROM THE CONTINUOUS STRIP/PLATE

(75) Inventors: Balkrishan Goenka, Mumbai (IN); Braja Mishra, Lloyds Garden, Appa Saheb Maratha Marg, Prabhadevi, Mumbai (IN); Prasantakumar Mukherjee, Adipur, Gandidham, Dist Kutch, Gujarat (IN)

(73) Assignee: Welspun Gujarat Stahl Rohren, Ltd., Mumbai (IN)

( * ) Notice: Subject to any disclaimer, the term of this patent is extended or adjusted under 35 U.S.C. 154(b) by 0 days.

(21) Appl. No.: 12/003,324

(22) Filed: Dec. 21, 2007

(65) Prior Publication Data
US 2008/0149688 A1 Jun. 26, 2008

Related U.S. Application Data

(60) Provisional application No. 60/876,108, filed on Dec. 21, 2006.

(51) Int. Cl.
*B21D 39/02* (2006.01)
*B23K 37/00* (2006.01)
(52) U.S. Cl. .................. 228/145; 228/5.7; 228/17.5; 228/17.7; 228/165
(58) Field of Classification Search .................. None
See application file for complete search history.

(56) References Cited

U.S. PATENT DOCUMENTS 3,201,559 A * 8/1965 Morris .................. 219/62

(Continued)

OTHER PUBLICATIONS

"Development of High Speed Submerged Arc Welding in Spiral Pipe Mill", Mitsuhiro Hanada et al., Transactions ISIJ, vol. 26, 1986, pp. 433-438.

(Continued)

*Primary Examiner*—Kiley Stoner
(74) *Attorney, Agent, or Firm*—Miles & Stockbridge P.C.; David R. Schaffer, Esq.

(57) ABSTRACT

A system and method of forming a continuous strip from a plurality of strips, each strip having a leading end and a trailing end. Embodiments can include a forming apparatus that chamfers at least one of the leading and trailing ends of each strip. The chamfered trailing ends may then be positioned against chamfered leading ends of successive ones of the plurality of strips. Once a leading end and a trailing end are positioned against one another, a first welding apparatus may weld on a first side, from above, the trailing and leading ends positioned against each other to form weld joints. Once at least two strips have been welded together, the strips can constitute the continuous strip. An inverting apparatus can then invert the continuous strip and weld joints. The inversion of the weld joints can be done so as not to create a reverse bend in the continuous strip. A second welding apparatus can then weld on a second side opposite the first side, from above, the inverted weld joints to form weld junctions. A pipe forming apparatus can form a pipe using the continuous strip, wherein the successively welded-together strips can be continuously or semi-continuously supplied to the pipe forming apparatus to form the pipe.

13 Claims, 16 Drawing Sheets

U.S. PATENT DOCUMENTS

| | | | | |
|---|---|---|---|---|
| 3,601,570 A | * | 8/1971 | Davis | 219/62 |
| 3,700,157 A | * | 10/1972 | Shumaker | 228/5.7 |
| 3,915,368 A | | 10/1975 | Ulmer | |
| 4,061,264 A | * | 12/1977 | Bartels et al. | 228/145 |
| 4,505,417 A | * | 3/1985 | Makarov et al. | 228/17.7 |
| 4,642,215 A | | 2/1987 | Klinvex et al. | |
| 4,645,893 A | | 2/1987 | Shimazaki et al. | |
| 4,863,091 A | | 9/1989 | Dubois | |
| 2008/0230586 A1 | * | 9/2008 | Kenmochi et al. | 228/144 |

OTHER PUBLICATIONS

International Application No. PCT/IB2007/004645 -PCT International Search Report and PCT Written Opinion of the International Searching Authority mailed Jul. 10, 2009.

* cited by examiner

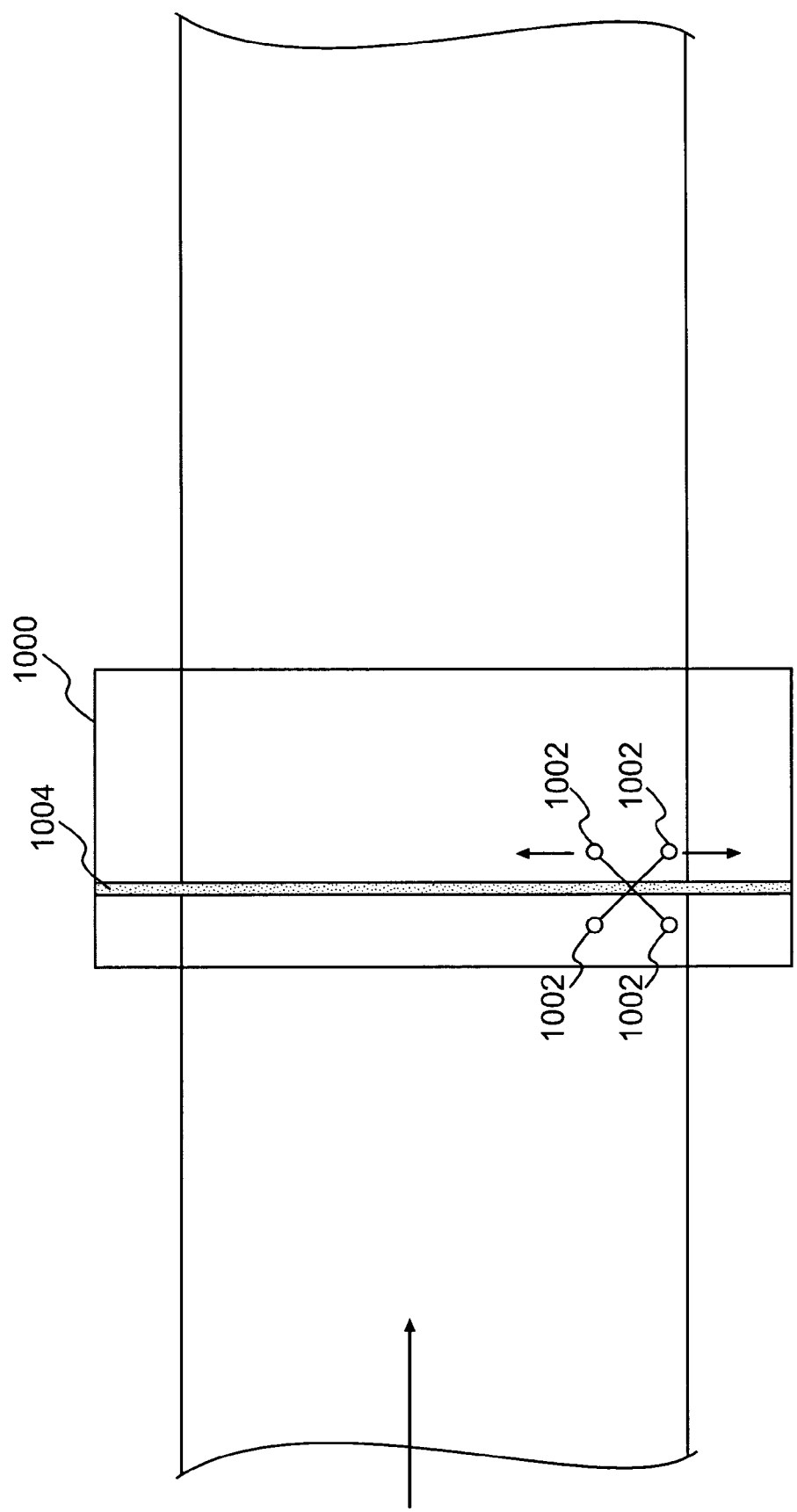

US 7,757,928 B2

SYSTEM AND METHOD FOR FORMING A CONTINUOUS STRIP/PLATE FROM A PLURALITY OF STRIPS/PLATES AND FOR FORMING A PIPE FROM THE CONTINUOUS STRIP/PLATE

RELATED APPLICATIONS

This application claims the benefit of and priority under 35 U.S.C. §119(e) to U.S. Provisional Application No. 60/876,108, filed Dec. 21, 2006. The patent application identified above is incorporated by reference in its entirety to provide continuity of disclosure.

FIELD OF THE INVENTION

The present invention relates generally to forming a continuous strip/plate from a plurality of strips/plates that are continuously fed. Additionally, the present invention relates generally to forming a pipe from the continuous strip/plate.

BACKGROUND

Some conventional systems and methods for forming pipes may create reverse bends in the strips/plates used to form the pipe. Reverse bending occurs when the strips/plates are bent in a direction opposite to the bend direction that the strips/plates are in when in a coiled configuration. Such reverse bending may degrade physical qualities of the strip/plate and/or the pipe formed.

BRIEF SUMMARY

A system and method of forming a continuous strip from a plurality of strips, each strip having a leading end and a trailing end. Embodiments can include a forming apparatus that chamfers at least one of the leading and trailing ends of each strip. The chamfered trailing ends may then be positioned against chamfered leading ends of successive ones of the plurality of strips. Once a leading end and a trailing end are positioned against one another, a first welding apparatus may weld on a first side, from above, the trailing and leading ends positioned against each other to form weld joints. Once at least two strips have been welded together, the strips can constitute the continuous strip. An inverting apparatus can then invert the continuous strip and weld joints. The inversion of the weld joints can be done so as not to create a reverse bend in the continuous strip. A second welding apparatus can then weld on a second side opposite the first side, from above, the inverted weld joints to form weld junctions. A pipe forming apparatus can form a pipe using the continuous strip, wherein the successively welded-together strips can be continuously or semi-continuously supplied to the pipe forming apparatus to form the pipe.

BRIEF DESCRIPTION OF THE DRAWINGS

The accompanying drawings, which are incorporated in and constitute a part of this specification, illustrate embodiments of the invention. The invention will be best understood by reading the ensuing specification in conjunction with the drawing figures, in which like elements are designated by like reference numerals, and wherein:

FIG. 19 is a representation of a testing apparatus according to various embodiments of the present invention;

DETAILED DESCRIPTION OF THE PREFERRED EMBODIMENTS

Embodiments of the present invention are directed generally to a system and method for forming a continuous strip or plate from a plurality of strips or plates and for forming a pipe from the continuous strip or plate, wherein each of the strips or plates have a leading end and a trailing end. Strips or plates can be welded on both sides using, for example, submerged arc welding to give a joint. The joint can be tested, for example, ultrasonically, on-line as a continuous strip or plate. Such testing may reduce or eliminate the need to inspect or repair cross joints of strips or plates. While the invention can use either strips or plates to form the continuous strip or plate and pipe, only the term strip will be used hereinafter to refer to both. Therefore, the use of the term strip does not limit the description to strips, as plates are equally applicable.

Generally, embodiments of the system and method can include (i.e., comprise) an uncoiling apparatus that can successively uncoil each of the strips from a coiled configuration having a first bend direction. The uncoiling can include feeding the leading and trailing ends from a top position of the coiled configuration. After being uncoiled, the strips can be successively fed to a weld joint forming apparatus that chamfers at least one of the leading and trailing ends of each of the strips. The forming apparatus can 'X' chamfer the ends. The 'X' chamfering can include forming a 'Y' cut, discarding a scrap end made from the 'Y' cut, and chamfering each end that is 'Y' cut to form the 'X' chamfer. The chamfered trailing ends may then be positioned against or adjacent chamfered leading ends of successive ones of the plurality of strips. Once a leading end and a trailing end are positioned against or adjacent one another, a first welding apparatus may weld, from above, the trailing and leading ends positioned against each other to form weld joints. Once at least two strips have been welded together, the strips can constitute the continuous strip. An inverting apparatus can then invert the weld joints. The inversion of the weld joints can be done so as not to create a reverse bend in the continuous strip. A second welding apparatus can then weld, from above, the inverted weld joints. A pipe forming apparatus can form a pipe using the continuous strip, wherein the successively welded-together strips can be continuously or semi-continuously supplied to the pipe forming apparatus to form the pipe. The pipe forming apparatus can form the pipe so as not to create a reverse bend in the continuous strip.

Figure 1:
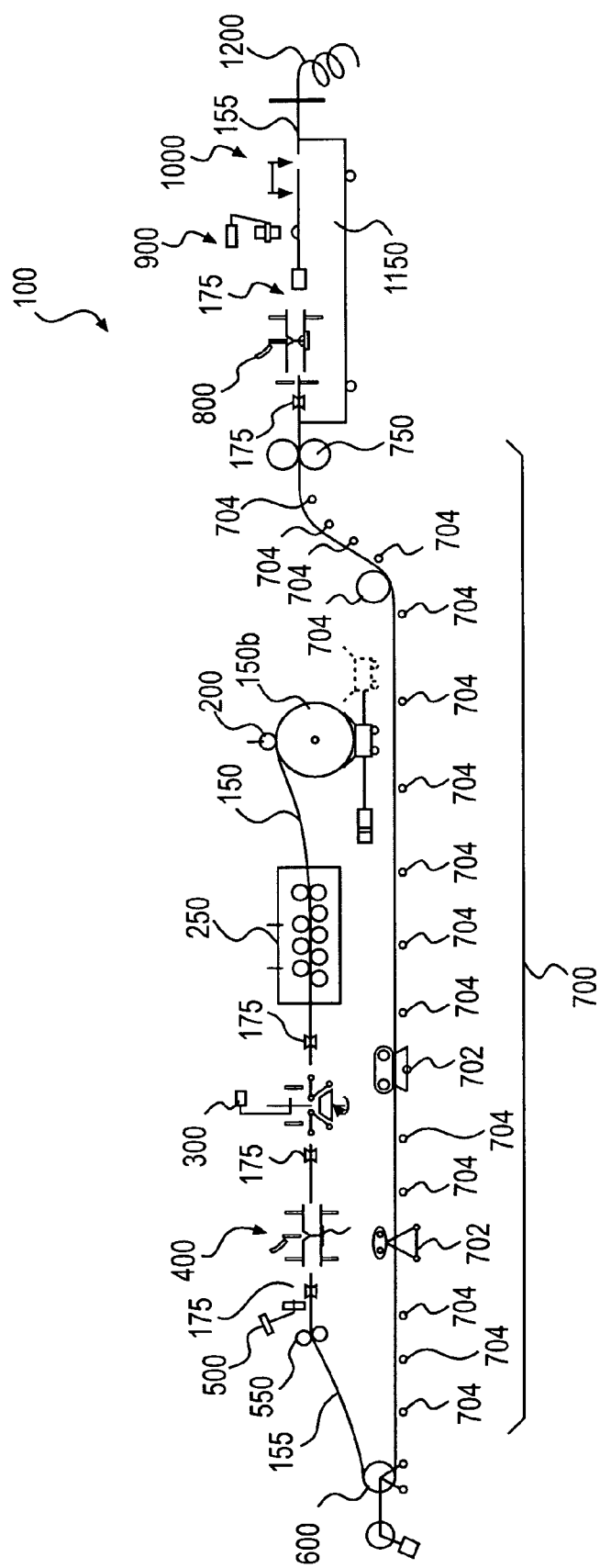
FIG. 1 is a side view block diagram of a system according to various embodiments of the present invention.

FIG. 1 shows a side view of a system 100 according to various embodiments of the present invention. As used herein, the phrase "various embodiments" is intended to mean an embodiment, at least one embodiment, some embodiments, and/or all embodiments without limitation. System 100 can form a continuous strip 155 from a plurality of strips 150. Additionally, system 100 can form a pipe from the continuous strip 155. In various embodiments, system 100 can include at least an uncoiling apparatus 200, a pinch roller and leveler apparatus 250, center guides 175 of any suitable number and at any suitable location in system 100, a weld joint forming apparatus 300, a first welding apparatus 400, a first reducing apparatus 500, an inverting apparatus 600, a conveying apparatus 700, a second welding apparatus 800, a second reducing apparatus 900, a testing apparatus 1000, and a pipe forming apparatus 1200. In various embodiments, at least forming apparatus 300, first welding apparatus 400, and first reducing apparatus 500 can be configured as one fixed, substantially stable station. Such a configuration may reduce the strips' exposure to jerks and shocks.

In one or more embodiments of the present invention, a coiled strip 150b may be positioned at or on uncoiling apparatus 200, and the uncoiling apparatus 200 may move the coiled strip 150b to a position to be uncoiled. Once in the position to be uncoiled, strip 150 may be fed from uncoiling apparatus through pinch roller and leveler apparatus 250 and into forming apparatus 300. Strip 150 may then be fed to weld joint forming apparatus 300, where one or more end of each strip may be formed. The strip 150 may then be fed to first welding apparatus 400. After a strip 150 is uncoiled, another strip may be positioned at uncoiling apparatus 200 in a coiled configuration 150b. This strip can be uncoiled after the first strip and fed in substantially the same manner as discussed above for the first strip. A leading end of the second strip can be fed to first welding apparatus 400 and welded, from above, to a trailing end of the first strip. Welding the two strips together can create the continuous strip 155. Another, or third, strip can be uncoiled and welded to the second strip substantially as described above for the first and second strips, thereby adding to the length of the continuous strip 155. Any suitable number of strips can be welded together to form the continuous strip 155. The continuous strip 155 can then be fed to first reducing apparatus 500 and then to an inverting apparatus 600, via a pinch roller 550. From inverting apparatus 600, the continuous strip 155 can be fed to second welding apparatus 800 via conveying apparatus 700, which may include trolleys 702 and rollers 704. Before being fed to second welding apparatus 800, the continuous strip may also be fed through pinch rollers 750. After being welded, from above, by second welding apparatus 800, the continuous strip 155 can be fed to second reducing apparatus 900, and then to testing apparatus 1000. After being tested by testing apparatus 1000, the continuous strip can be fed to a pipe forming apparatus 1200.

Strips 150 can be made from any suitable material, including, but not limited to, metal, steel, alloys, etc. Moreover, strips 150 can be formed in any suitable configuration (including as a plate), and can have any suitable dimensions. For example, strips 150 can have a thickness of up to about 1 inch thick and can have a width of between about 40 inches to about 110 inches. In some embodiments, each strip 150 initially can be in a coiled configuration 150b.

Figure 2:
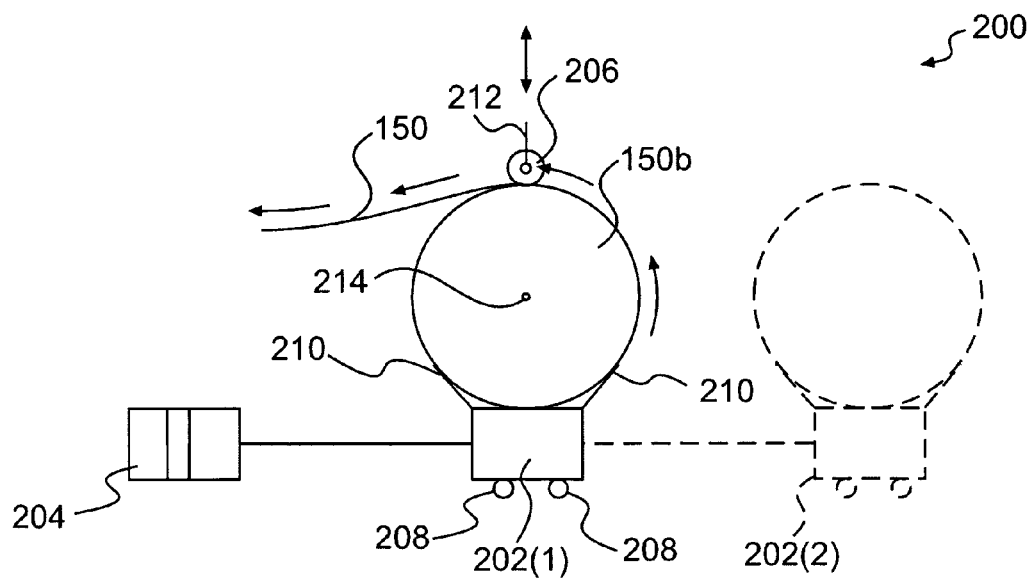
FIG. 2 is a representation of an uncoiling apparatus and a strip in a substantially coiled configuration according to various embodiments of the present invention.

Features of system 100 will now be described. FIG. 2 shows uncoiling apparatus 200 according to various embodiments. Uncoiling apparatus 200 can be any suitable apparatus of any suitable configuration to uncoil strips 150 from a coiled configuration 150b. The coiled configuration 150b can be of any suitable size and diameter, and the strips 150 can be uncoiled from their coiled configuration 150b at any suitable rate or speed.

Uncoiling apparatus 200 can include at least coil carrying apparatus 202, actuating apparatus 204, and feed drum 206. Also, though not shown, coil carrying apparatus 202 can include an apparatus to drive a spindle 214 about which the strip in the coiled configuration 150b can be unwound. In various embodiments, the apparatus to drive spindle 214 may be a spindle motor. Coil carrying apparatus 202 can be mechanically coupled to actuating apparatus 204, and feed drum 206 can be used to feed or uncoil the strip from its coiled configuration 150b. In addition, or alternatively, the apparatus to drive spindle 214 may be used to feed or uncoil the strip from its coiled configuration 150b.

Feed drum 206 can be of any suitable configuration, including, but not limited to, a cylinder of any suitable size and shape. Feed drum 206 also may be coupled to an arm 212 that may be controlled by an actuator (not shown). In various embodiments, feed drum 206 can be in continuous contact with the strip in the coiled configuration 150b as the strip is uncoiled. Further, feed drum 206 may be in continuous contact with the strip until the strip is uncoiled entirely. To remain in continuous contact, feed drum 206 may be moved with respect to the strip in a coiled configuration 150b as the strip is being uncoiled. In various embodiments, feed drum 206 can be moved up and down (see arrow), with arm 212 (and actuator) being used to move feed drum 206. For example, as the strip 150b is being uncoiled, the coil becomes smaller in diameter. To remain in continuous contact with the strip in its coiled configuration 150b, arm 212 may move down as the strip is uncoiled. Once the entire strip has been uncoiled, the feed drum 206 may return, by moving upward, to an upper position for receipt of another strip in a coiled configuration 150b.

The strip in the coiled configuration 150b can be loaded onto coil carrying apparatus 202 by any suitable means, and coil carrying apparatus 202 can be configured to "carry" the strip in a coiled configuration to a position whereby the strip 150 can be uncoiled. Coil carrying apparatus 202 may include arms 210 and a plurality of wheels 208, with the wheels 208 facilitating movement of coil carrying apparatus 202. Arms 210 can be used to support and/or stabilize the strip 150 in the coiled configuration 150b, such that the strip in the coiled configuration 150b remains in position on coil carrying apparatus 202. In various embodiments, arms 210 can be biased against the strip in a coiled configuration 150b to support and/or stabilize the strip in the coiled configuration 150b, such that the strip in the coiled configuration 150b remains in position on coil carrying apparatus 202. Additionally, arms 210 are configured such that they support and/or stabilize the strip in the coiled configuration, while also allowing the strip in the coiled configuration 150b to be uncoiled.

Actuating apparatus 204 can be mechanically coupled to coil carrying apparatus 202, and can be any suitable apparatus configured to move coil carrying apparatus 202. For example, actuating apparatus 204 can be a hydraulic cylinder or an electrical driver system that moves coil carrying apparatus between first position 202(1) and second position 202(2). In various embodiments, the first position of coil carrying apparatus 202(1) may allow for a strip 150 to be uncoiled, and the second position of coil carrying apparatus 202(2) may allow for receiving a strip 150 in a coiled configuration 150b.

Strip 150 can be fed from uncoiling apparatus 200 in any suitable manner. For example, strip 150 may be fed from the coiled configuration 150b in the left direction (coiled configuration rotating counterclockwise). Note, however, that the strip can likewise be fed from the coiled configuration 150b in the right direction (coiled configuration rotating counterclockwise). The first end of the strip 150 that is fed from uncoiling apparatus 200 can be labeled the leading end of the strip and the second end of the strip that is fed from the uncoiling apparatus 200 can be labeled the trailing end of the strip.

Furthermore, in various embodiments, strip 150, in its coiled configuration 150b, can be uncoiled or fed from substantially the top and not from the bottom of the coiled configuration 150b (see arrows). Further, feed drum 206 can be configured at substantially the top of the coiled configuration 150b, and may allow for the strip 150 to be fed from its coiled configuration 150b at substantially the top of the coiled configuration 150b. Feeding strip 150 from the top may allow for the finish of the strip 150 to be protected from scale that has peeled off the strip 150. For example, any metal scale, film and/or other debris that has fallen from strip 150 as it is uncoiled may be prevented from being transported to pinch roller and leveler apparatus 250 with the strip 150, thereby preventing the finish of the strip 150 from being damaged.

In operation, an empty uncoiling apparatus 202 can be moved to the second position 202(2) to receive a strip 150 in its coiled configuration 150b. Uncoiling apparatus 202 may then move to the first position 202(1) to allow for the next strip to be uncoiled. After the strip 150 is uncoiled, and again empty, uncoiling apparatus 202 may move to the second position 202(2) to feed another strip 150 in coiled configuration. In various embodiments, this process can be repeated, continuously if desired, until a predefined number of strips have been uncoiled. Moreover, any suitable number of strips 150 can be uncoiled. In various embodiments, the number of strips to be uncoiled can be based on the length of the pipe to be made or the length of the continuous strip to be formed.

After being uncoiled, strip 150 can be received by any suitable apparatus in system 100. In various embodiments, strip 150 can be supplied to pinch roll and leveler apparatus 250 (shown generally in FIG. 1). Pinch roll and leveler apparatus 250 can be of any suitable configuration known in the art, and will not be described in detail herein.

Figure 3:
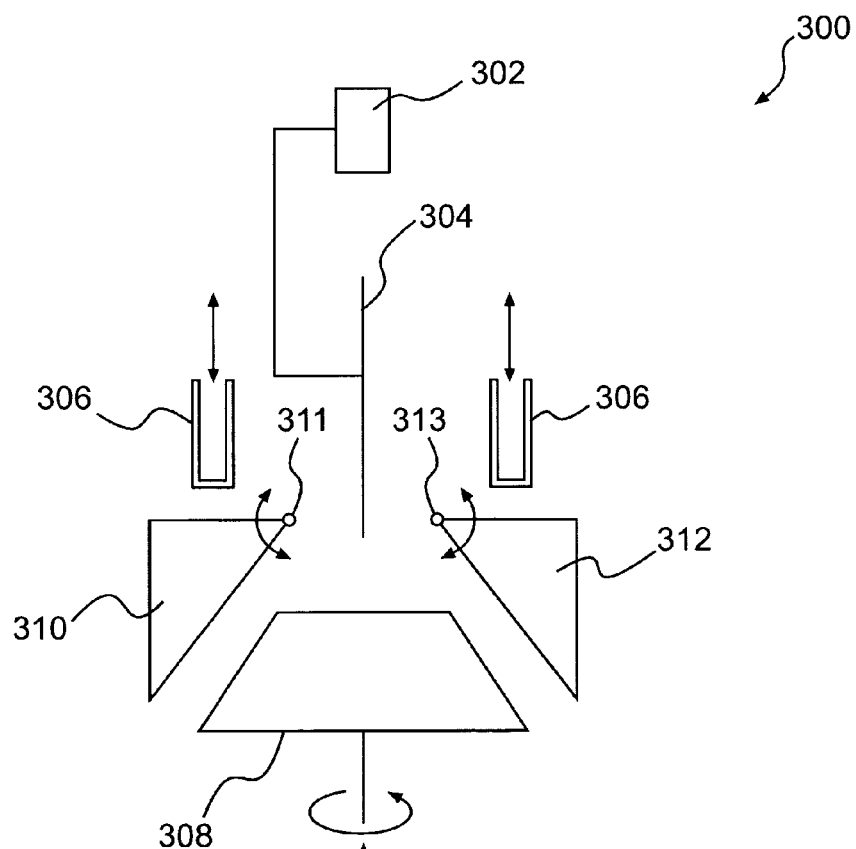
FIG. 3 is a representation of an edge forming apparatus according to various embodiments of the present invention.

After being uncoiled, strip 150 may be received by forming apparatus 300. FIG. 3 shows edge forming apparatus 300 according to various embodiments. Edge forming apparatus 300 can be any suitable apparatus that forms one or more of the leading and trailing ends of strip 150. Edge forming apparatus can form each end, one at a time. Moreover, the formed ends for one strip may be substantially the same as the formed end or ends of another strip.

In various embodiments, edge forming apparatus 300 can be a combined cutting and chamfering apparatus. Edge apparatus 300 can include actuating apparatus 302, cutting apparatus 304, a plurality of holding apparatuses 306, chamfering apparatus 308, first discarding apparatus 310, second discarding apparatus 312, may be one or more strip position indicators (not shown), and one or more aligning apparatuses (not shown).

The aligning apparatuses and strip position indicators can facilitate positioning and alignment of the strip end on edge forming apparatus 300. Strip position indicators can be any suitable indicators that can identify the ends of strips by any suitable means. For example, strip position indicators can provide a laser or optical signal indicating that an end of strip 150 is at a specified position on forming apparatus 300. Strip position indicators can be used to position strip 150 at the appropriate position at edge forming apparatus 300. For example, strip position indicators may send a signal that causes system 100 to stop the strip 150 at the appropriate position at edge forming apparatus 300. The signal or signals of the strip position indicators can be received by any suitable means, including, but not limited to, a processor, a computer, a controller, etc.

The plurality of holding apparatuses 306 can be configured to hold the end of the strip in a desired position during the cutting and chamfering operations of forming apparatus 300. In various embodiments, holding apparatuses 306 can be clamps that clamp an end of the strip 150 to discarding apparatuses 310, 312. Holding apparatuses 306 can move up to release the end of strip 150 and can move down to hold the end of strip 150 (see arrows). Moreover, holding apparatuses 306 can be configured to hold any suitable shape and/or size of strip 150. Additionally, holding apparatuses 306 can be moved by any suitable means, including, but not limited to, motors, actuators, servos, etc.

Actuating apparatus 302 can be any suitable apparatus configured to operate cutting apparatus 304 to cut an end of a strip that is positioned in the edge forming apparatus 300 including, but not limited to, an electric motor, pneumatic motor, etc. Cutting apparatus 304 can be any suitable apparatus configured to cut, one at a time, ends of strips 150. For example, cutting apparatus 304 may be a saw of any suitable configuration, including, but not limited to, a cold saw that "cold cuts" the ends of the strip 150. In various embodiments, cutting apparatus 304 moves across the width of strip 150 to cut the entire width of strip 150. Moreover, a cut through the entirety of the thickness of strip 150 may be cut through the entire width of strip 150.

The strip ends can be cut to any suitable shape or configuration like 'Y' or 'X' by any suitable method. For example, cutting apparatus 304 may create a 'Y' cut in the end of strip 150, with the 'V' portion of the 'Y' cut also being any suitable dimensions and angle. The 'Y' cutting may leave a scrap end or may merely chamfer the upper edge of the end of the strip to form the 'Y'. The cutting apparatus 304 may have alternate carbide bits for performing a straight cut, a root face cut, and a V cut.

If the 'Y' cut leaves a scrap end, first discarding apparatus 310 and second discarding apparatus 312 may be used to discard or remove the scrap end from the edge forming apparatus 300. First and second discarding apparatuses 310, 312 can be any suitable apparatuses configured to discard an associated scrap end of the strip 150 that may be produced after a first 'Y' cut and that remains on the corresponding discarding apparatus 310, 312. In various embodiments, once an end is 'Y' cut such that a scrap end is produced, the appropriate discarding apparatus (first discarding apparatus 310, in the case where the scrap end results from cutting a leading end, and second discarding apparatus 312, in the case where the scrap end results from cutting a trailing end) may operate to discard the scrap end. For example, the appropriate discarding apparatus 310, 312 may operate so as to remove the scrap end from the line of movement of the strip. In various embodiments, the appropriate discarding apparatus 310, 312 may move to discard the scrap end by, for example, rotating or tilting to discard the scrap end. Further, the discarding apparatuses 310, 312 may rotate or tilt about respective fixed axes 311, 313, respectively, which can be at any suitable position. For example, FIG. 3 shows the fixed axes 311, 313 being located at upper inside points of the discarding apparatuses. In the example in FIG. 3, first discarding apparatus 310 may rotate clockwise and counterclockwise around fixed axis 311, with a clockwise rotation being performed to discard a scrap end from a 'Y' cut of a leading end (see curved arrow). Similarly, second discarding apparatus 312 also may rotate clockwise and counterclockwise around fixed axis 313, with a counterclockwise rotation being performed to discard a scrap end from a 'Y' cut of a trailing end (see curved arrow). As noted above, however, the discarding apparatuses 310, 312 can be moved in any suitable way to discard or remove a scrap end, and are not limited to rotating clockwise or counterclockwise, as discussed above with respect to FIG. 3. The scrap end can be discarded or removed to a tray or conveyor (not shown) which can be located below the appropriate discarding apparatus 310, 312. Additionally, the appropriate discarding apparatus 310, 312 may operate to discard the scrap end in cooperation with an associated holding apparatus 306. For example, before the appropriate discarding apparatus 310, 312 operates to discard the scrap end thereon, the associated holding apparatus 306 may release the scrap end.

Chamfering apparatus 308 can be any suitable apparatus configured to chamfer one or more ends of strip 150. In various embodiments, after cutting apparatus 304 makes a 'Y' cut at the end of strip 150, chamfering apparatus can chamfer the end of strip 150. In various embodiments where the cutting apparatus 304 makes a 'Y' cut that produces a scrap end, the scrap end is discarded before chamfering apparatus 308 chamfers the end. To chamfer the strip end, chamfering apparatus 308 can move across the entire width of strip 150. Moreover, chamfering apparatus 308 can rotate in any suitable direction for chamfering the end. For example, FIG. 3 shows chamfering apparatus 308 rotating in a counterclockwise direction. Chamfering apparatus 308 also may be moved up and down (see vertical arrow) with respect to the end to appropriately chamfer the strip end. In various embodiments, chamfering apparatus 308 can form a 'V' at the bottom of the 'Y' cut end of strip 150, thereby creating an overall 'X' chamfer at the strip end. The dimensions of the 'X' chamfer can be any suitable dimensions. For example, the root face (the face perpendicular to the length of the strip) can be pre-selected based on various welding parameters for welding leading and trailing ends of successive strips 150 together. Moreover, the dimensions of the 'X' chamfer also can be pre-selected based on welding parameters. In various embodiments, the 'X' chamfer of a trailing end of a strip is substantially identical to the 'X' chamfer of a leading end of the next, successive strip 150. Matching the parameters of the 'X' chamfers for the trailing and leading ends ('Y,' 'V,' and root faces) may allow for better alignment and a better weld joint when welding ends of the strips together.

Figure 4:
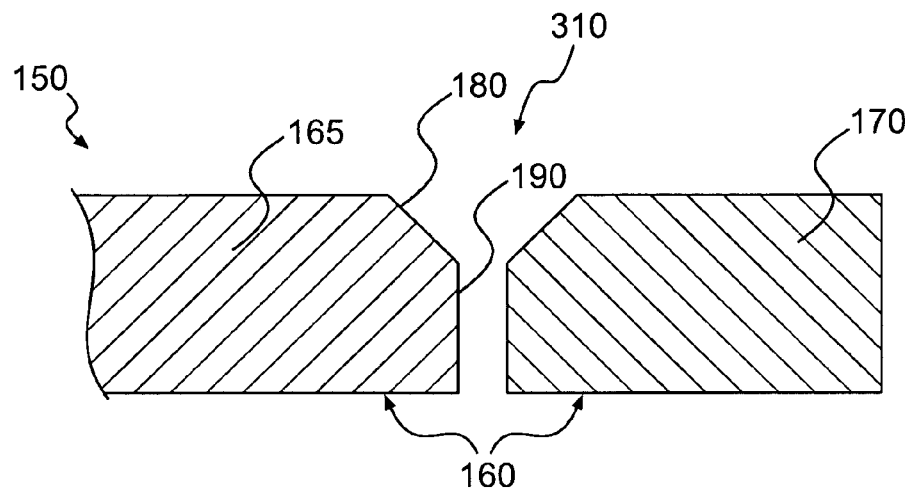
FIG. 4 shows the formation of a 'Y' cut in a trailing end of a strip according to various embodiments of the present invention.
Figure 5:
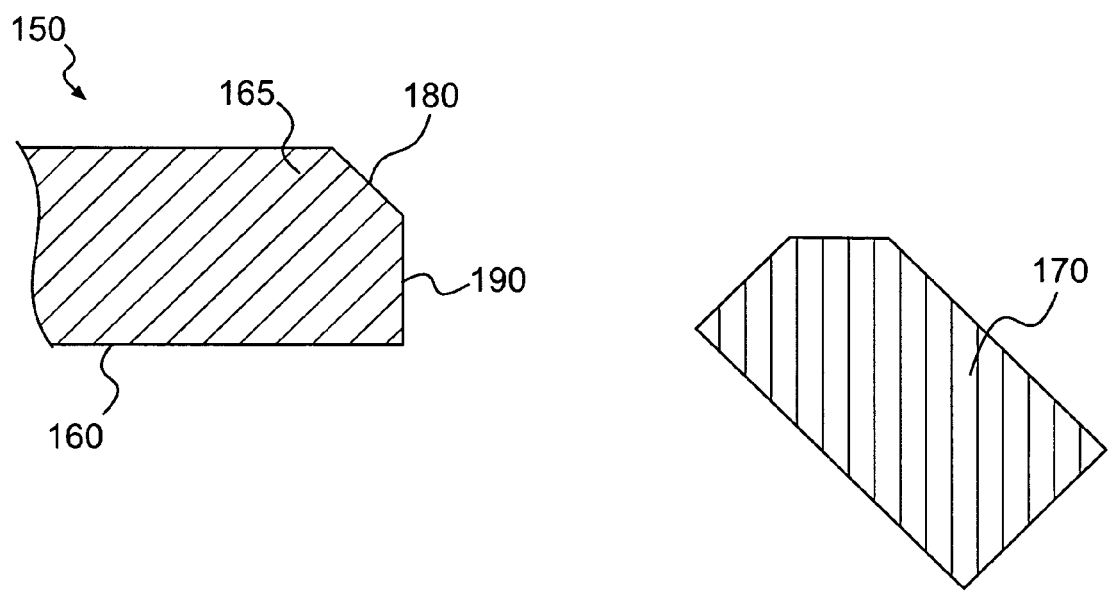
FIG. 5 shows discarding a scrap end after making the 'Y' cut in the trailing end of a strip according to various embodiments of the present invention.
Figure 6:
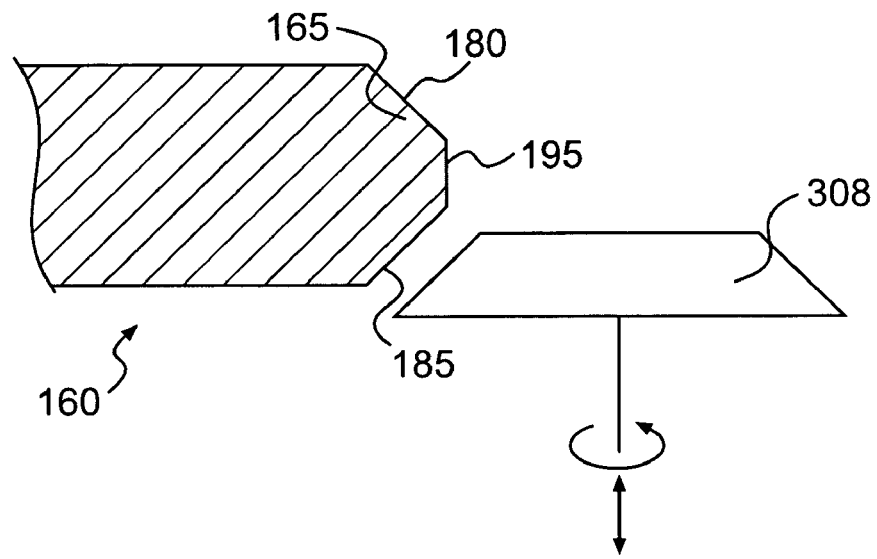
FIG. 6 shows the formation of an 'X' chamfer at the trailing end of a strip according to various embodiments of the present invention.
Figure 7:
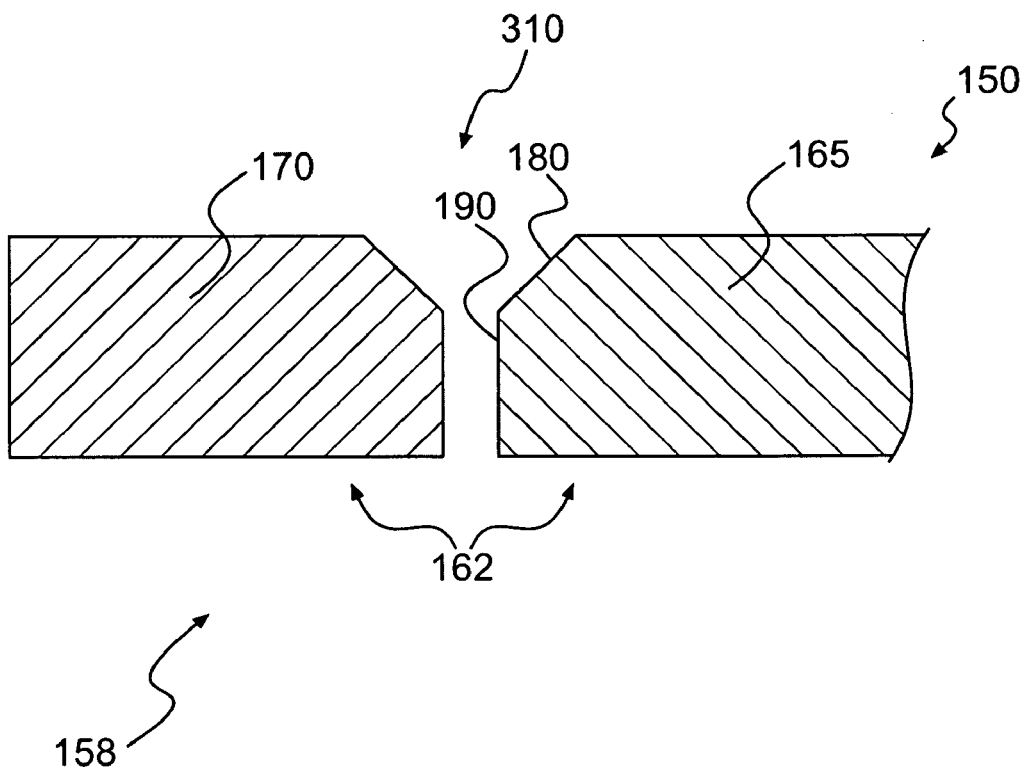
FIG. 7 shows the formation of a 'Y' cut in a leading end of a strip according to various embodiments of the present invention.
Figure 8:
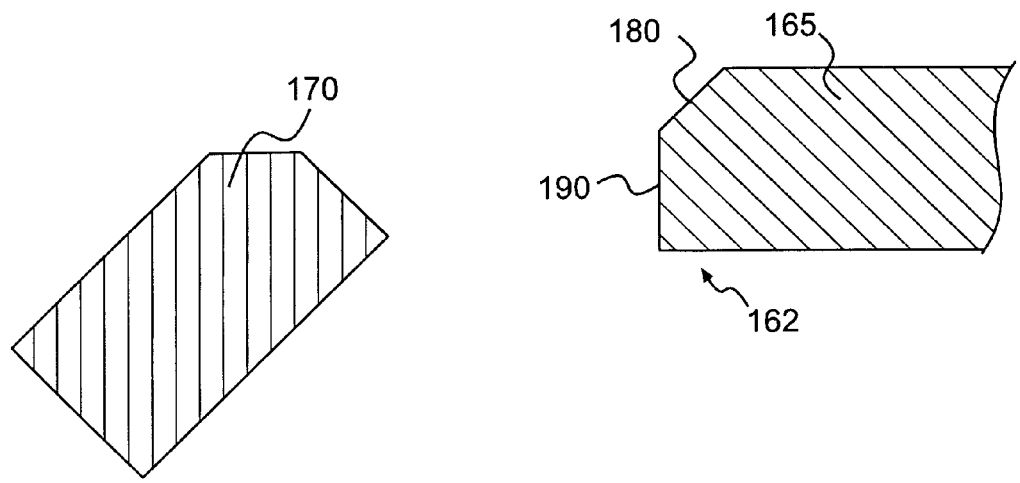
FIG. 8 shows discarding a scrap end after making the 'Y' cut in a leading end of a strip according to various embodiments of the present invention.
Figure 9:
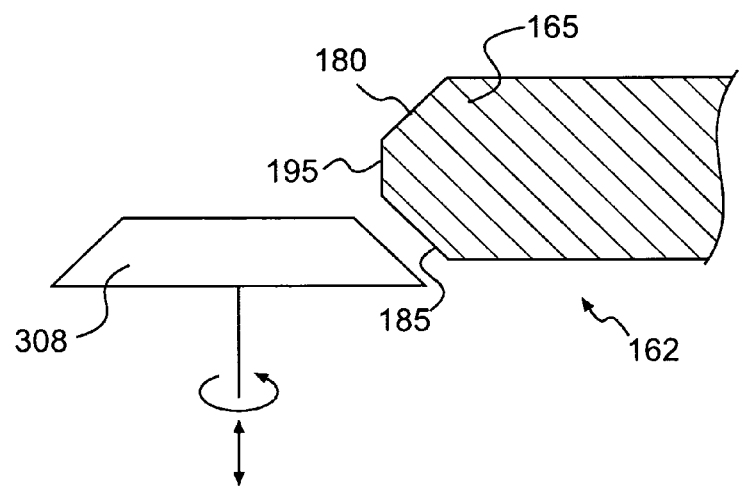
FIG. 9 shows the formation of an 'X' chamfer at the leading end of a strip according to various embodiments of the present invention.

FIGS. 4-6 illustrate a trailing end 160 of strip 150 being cut and chamfered and FIGS. 7-9 illustrate a leading end 162 of strip 150 being cut and chamfered. The cutting and chamfering in FIGS. 4-9 show the 'Y' cut producing a scrap end. However, as discussed above, the 'Y' cutting may performed such that a scrap end is not produced.

FIG. 4 shows a 'Y' cut 310 having been made in trailing end 160 of strip 150. As noted above, in various embodiments, cutting apparatus 304 can create 'Y' cut 310 at the trailing end 160, thereby leaving a 'Y' chamfered end 165 and a scrap end 170. 'Y' chamfered end 165 may have a 'V' portion 180 and a flat portion 190 that may be substantially perpendicular to the length-wise direction of strip 150. The 'V' portion 180 can be of any suitable dimension and/or angle with the length of strip 150. Likewise, perpendicular portion 190 can be of any suitable dimension.

FIG. 5 shows a representation of scrap end 170 being discarded. Scrap end 170 may be discarded by any suitable means. In various embodiments, second discarding apparatus 312 can discard scrap end 170. The operation of second discarding apparatus 312 can be substantially the same as described above for FIG. 3.

FIG. 6 shows the bottom edge of 'Y' chamfered end 165 being chamfered. Chamfering apparatus 308 can move in any suitable way to chamfer the bottom edge of 'Y' chamfered end 165. For example, chamfering apparatus 308 can rotate, either clockwise or counterclockwise to perform the chamfering. Moreover, chamfering apparatus 308 can be moved vertically with respect to the bottom edge of the strip, as well as across the entire width of the strip to chamfer the bottom edge of 'Y' chamfered end 165. Further, chamfering apparatus 308 can be moved in the above-noted directions by any suitable means. For example, a motor (not shown) may drive chamfering apparatus 308 in one or both rotational directions. With respect to movement in the vertical direction, any suitable means may be implemented. For example, an actuator (not shown) may be used to move chamfering apparatus 308 vertically. In various embodiments, chamfering apparatus 308 can chamfer a 'V' portion 185 of any suitable dimension and/or angle in the bottom edge of 'Y' chamfered end 165. Forming the 'V' portion 185 effectively forms an 'X' chamfer at the end. The 'X' chamfer may include 'V' portions 180, 185 and root face 195. In various embodiments, root face 195 can be substantially perpendicular to the length-wise direction of strip 150. Moreover, root face 195 can be predetermined and can be controlled by adjustment of cutting apparatus 304 and chamfering apparatus 308.

The cutting and chamfering of the leading end 162 of strip 150 is similar to that of the trailing end. As can be seen in FIG. 7, a 'Y' cut 310 is made in leading end 162 of strip 150. As noted above, in various embodiments, cutting apparatus 304 can create 'Y' cut 310 at the leading end 160, thereby leaving a 'Y' chamfered end 165 and a scrap end 170. 'Y' chamfered end 165 may have a 'V' portion 180 and a flat portion 190 that may be substantially perpendicular to the length-wise direction of strip 150. The 'V' portion 180 can be of any suitable dimension and/or angle with the length of strip 150. Likewise, perpendicular portion 190 can be of any suitable dimension.

FIG. 8 shows scrap end 170 being discarded. Scrap end 170 can be discarded by any suitable means. In various embodiments, first discarding apparatus 310 can discard scrap end 170. The operation of first discarding apparatus 310 can be substantially the same as described above for FIG. 3.

FIG. 9 shows the bottom edge of 'Y' chamfered end 165 being chamfered. In various embodiments, chamfering apparatus 308 can chamfer a 'V' portion 185 of any suitable dimension and/or angle in the bottom edge of 'Y' chamfered end 165, thereby forming an 'X' chamfered end. The 'X' chamfered end may include 'V' ends 180, 185 and root face 195. In various embodiments, root face 195 can be substantially perpendicular to the length-wise direction of strip 150. Moreover, root face 195 can be predetermined and can be controlled by adjustment of cutting apparatus 304 and chamfering apparatus 308.

Figure 10:
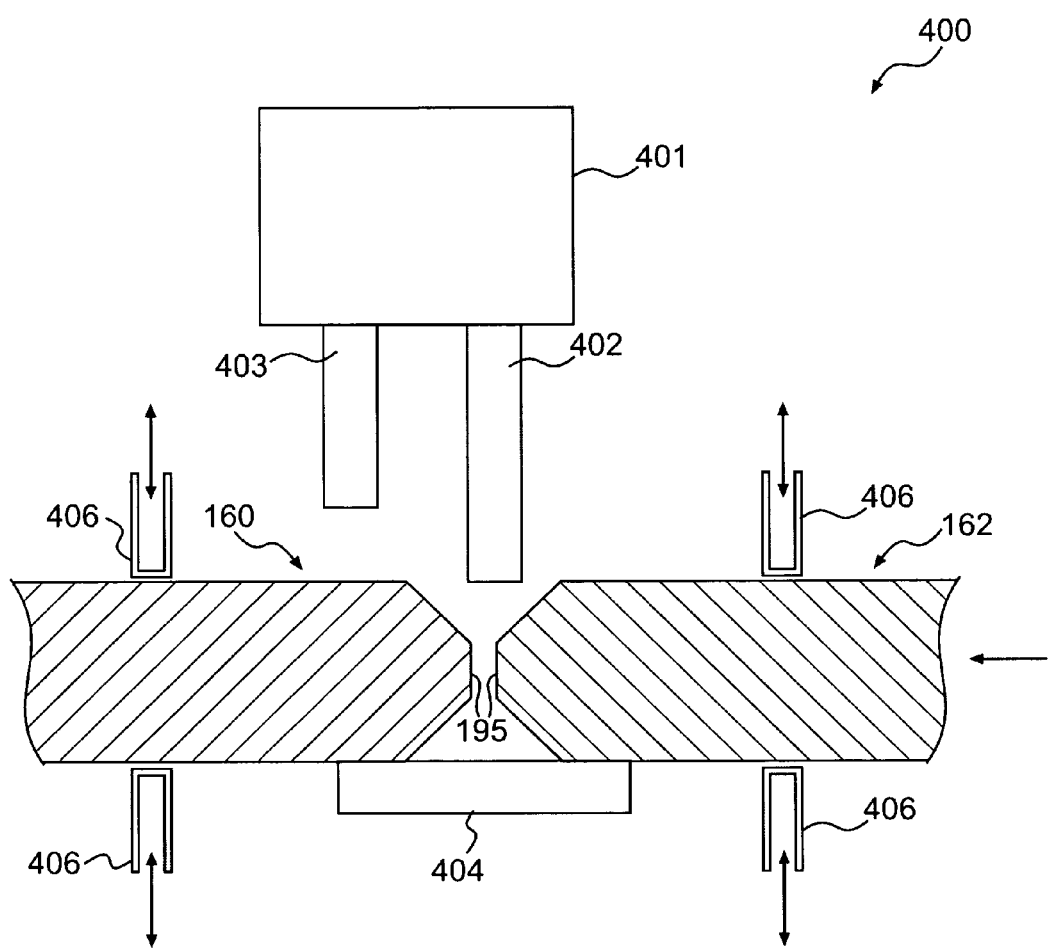
FIG. 10 is a representation of a first welding apparatus and leading and trailing ends being positioned thereat according to various embodiments of the present invention.

After the end is formed by the edge forming apparatus 300, the strip 150 may be sent to any suitable apparatus of system 100. In various embodiments, strip 150 can be sent to first welding apparatus 400. FIG. 10 shows first welding apparatus 400 according to various embodiments. FIG. 10 also shows trailing and leading ends 160, 162 being at first welding apparatus 400. First welding apparatus 400 can be any suitable means by which a trailing end and a leading end of successive strips 150 can be welded together. Additionally, first welding apparatus 400 can weld by any suitable method, including, but not limited to, gas metal arc welding, TIG welding, flux cored arc welding (FCAW), submerged arc welding (SAW), plasma arc welding, etc.

First welding apparatus 400 can include welder 401, holding apparatuses 406, and a back-plate 404. Back-plate 404 can be made of any suitable material, including, but not limited to, copper, etc.

Holding apparatuses 406 can be any suitable holding apparatus. In various embodiments, holding apparatuses 406 can include a pair of holding apparatus for each end 160, 162. For example, in some embodiments, holding apparatuses 406 can be clamps that clamp respective ends of strips 160, 162 to back plate 404. As can be seen from the arrows with each holding apparatus 406, the holding apparatuses 406 can move to release and contact the associated end of strip 160, 162. Holding apparatuses 406 can be moved by any suitable means, including, but not limited to, motors, actuators, manually, etc. Further, holding apparatuses 406 can be commanded to be actuated by a command from a sensor, such as an optical device, a laser, etc. In various embodiments, pairs of holding apparatuses 406 can be configured to contact opposite sides of ends 160, 162 to hold the respective strip ends at desired positions with respect to each other in coupling apparatus 400. Strip ends 160, 162 can be positioned with respect to each other at any suitable distance. In various embodiments, the ends 160, 162 can be positioned substantially against or adjacent each other. More specifically, 'X' chamfered end 195 of the trailing end 160 and 'X' chamfered end 195 of the leading end 162 can be positioned against or adjacent against each other. Once the 'X' chamfered ends are positioned against or adjacent each other, holding apparatuses 406 can be activated to hold the 'X' chamfered ends 195 in place. When 'X' chamfered ends 195 are held together, their combined 'V' angles can be any suitable degree amount, including, but not limited to, angles from about 60 degrees to about 110 degrees. As noted above, the formation of the ends 160, 162, including the 'V' angles, can be based on the method of welding being performed, as well as the thickness of the strips being welded.

Welder 401 can be any suitable apparatus that welds by any suitable method, including, but not limited to the methods listed above. In various embodiments, welder 401 can be a submerged arc welding apparatus of any suitable configuration. Welder 401 can work in conjunction with a flux feeder 403, which can supply flux, and at least one welding wire 402, which can supply the arc. Submerged arc welding and apparatuses that perform submerged arc welding are known in the art and a substantial description hereof will not be provided.

Welder 401 welds the trailing end 160 of a strip to the leading end 162 of another successive strip, thereby producing a weld joint. In various embodiments, welder 401 can be positioned above the junction between the trailing end 160 and the leading end 162. Moreover, welder 401 can weld, from above, the trailing end 160 of a strip and the leading end 162 of another strip to produce the weld joint 1100. In various embodiments, the welding may be performed from the top under full visual control.

Figure 11:
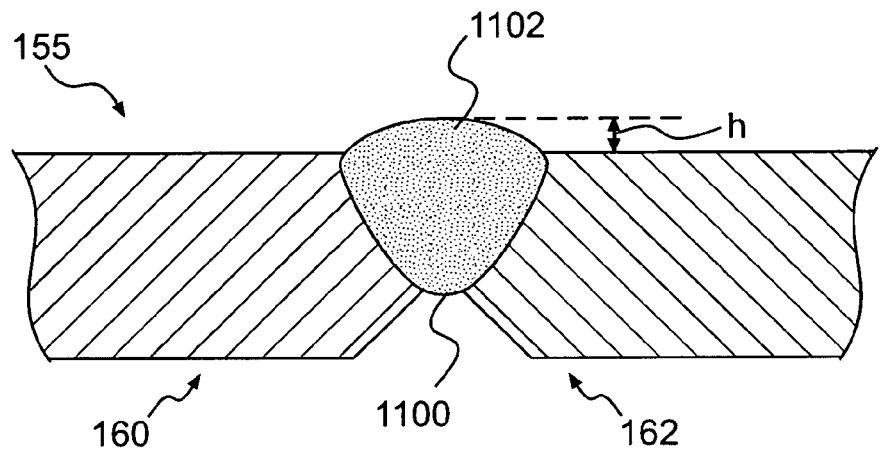
FIG. 11 shows a first overweld portion formed at a weld joint for a trailing end of one strip and a leading end of another strip according to various embodiments of the present invention.

FIG. 11 shows the junction where trailing end 160 and leading end 162 are welded together to form weld joint 1100. The welding process can allow weld metal to penetrate the junction between the ends by any suitable amount. For example, in the welding process, the root face 195 of the strip ends 160, 162 (as shown in FIG. 10) can be covered by weld metal. In FIG. 11, the root face 195 of the strip ends 160, 162 can be covered by weld metal in any suitable amount. For example, about 80% of the root face 195 may be covered by weld metal.

The welding process may also produce an overweld portion. FIG. 11 shows an overweld portion 1102 according to various embodiments. As can be seen in FIG. 11, overweld portion 1102 may be formed on the top surface of the strips at the weld joint 1100. Overweld portion 1102 may be of any suitable form, including, but not limited to, a weld bead, and can project above the surface of the strips 150 to any suitable height h (measured from surface of strips 150). For example, overweld portion 1102 can project above the surface of the strips 150 to a height of about 1 mm to about 2 mm. The welding from above can leave an unwelded portion of the opposite side of the junction between strip ends 160, 162. In various embodiments, the unwelded portion is at the lower 'V' portions of strip ends 160, 162. The welded-together strips can now be labeled as the continuous strip 155.

Figure 12:
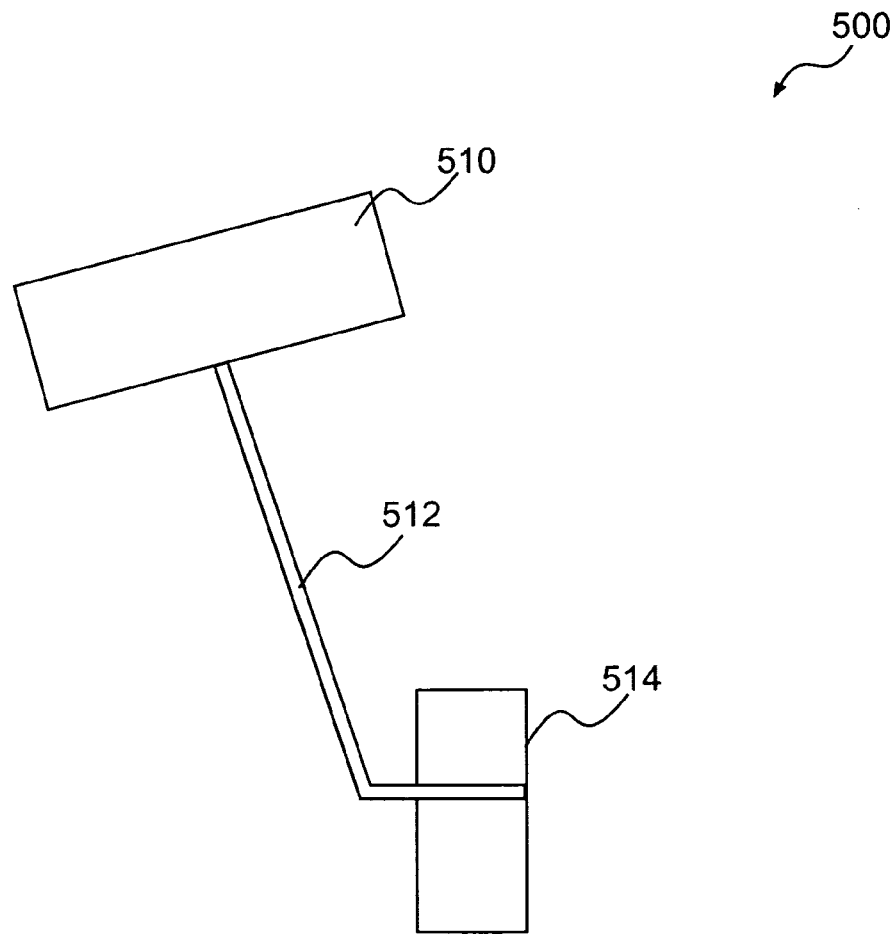
FIG. 12 is a representation of a first reducing apparatus according to various embodiments of the present invention.

The continuous strip 155, including weld joint 1100, can then be sent to any suitable apparatus of system 100. If necessary, in various embodiments, weld joint 1100 can be sent to first reducing apparatus 500. FIG. 12 shows first reducing apparatus 500 according to various embodiments. First reducing apparatus 500 can be any suitable apparatus of any suitable configuration that can reduce overweld portion 1102. First reducing apparatus 500 may include a motor 510, an actuator, 512, and a reducer 514. Motor 510 can operate actuator 512 to move reducer 514 with respect to the overweld portion 1102 to reduce the overweld portion 1102 a desired amount or to a predetermined height within predetermined specifications. Reducer 514 can reduce overweld portion 1102 by any suitable means, including, but not limited to, grinding, shaving, etc. In various embodiments, reducer 514 can be a grinding wheel that grinds down overweld portion 1102 (shown in FIGS. 13A and 13B).

First reducing apparatus 500 can be used to reduce the height h of overweld portion 1102 if it is determined that the height h is not within predetermined specifications. The height h of overweld portion 1102, as well the determination that the height h is not within predetermined specifications, can be determined by any suitable means including, but not limited to, a visual check by any suitable optical apparatus, a visual check by a human, etc. As noted above, the overweld portion 1102 can be reduced by any suitable amount. In various embodiments, the overweld portion 1102 can be reduced or "trimmed" to substantially the same level as the surfaces of strip ends 160, 162.

Figure 13A:
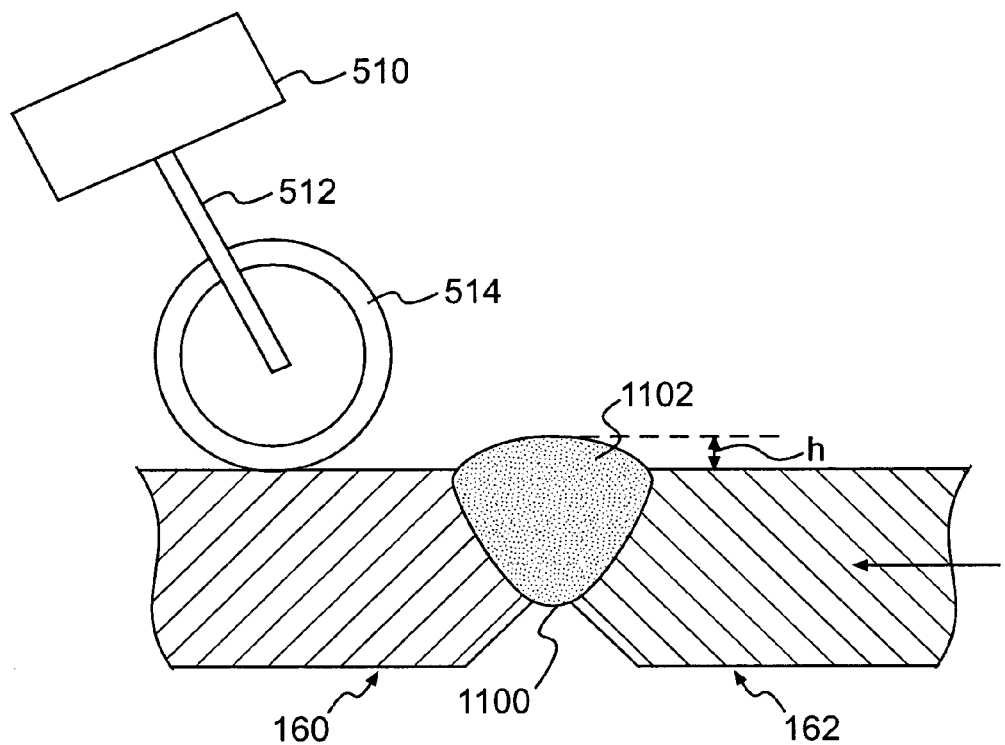
FIG. 13A shows a first overweld portion being supplied to the first reducing apparatus according to various embodiments of the present invention.
Figure 13B:
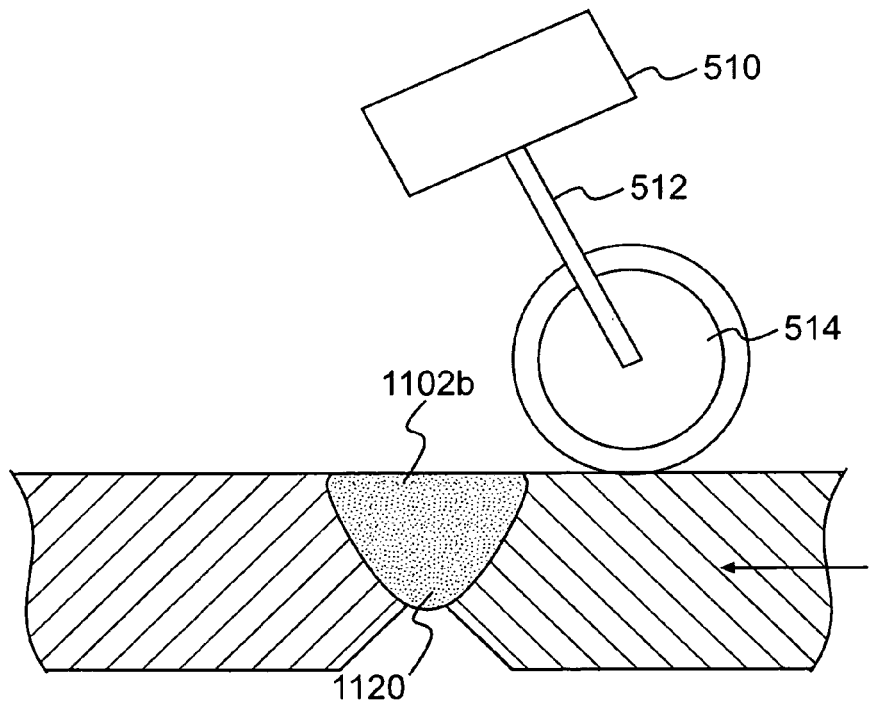
FIG. 13B shows the weld joint after subjecting the first overweld portion to the first reducing apparatus according to various embodiments of the present invention.

FIGS. 13A and 13B respectively show the overweld portion 1102 before and after being reduced by reducing apparatus 500. As can be seen from FIG. 13A, overweld portion 1102 has a height h above the surfaces of trailing and leading ends 160, 162. The left-going arrow in FIG. 13A represents the direction of movement of the weld joint 1100 with respect to reducer 514 of the reducing apparatus 500. Reducer 514 may be in a substantially fixed position or may be movable to reduce the overweld portion 1102 a desired amount. In various embodiments, reducer 514 may rotate, at any suitable rate, to reduce overweld portion from the height h. Turning to FIG. 13B, the weld joint 1100 has passed reducer 514, with a reduced overweld portion 1102b. In various embodiments, reduced overweld portion 1102b can be at substantially the same level as the surfaces of trailing and leading ends 160, 162. Alternatively, the weld joint 1100 can be brought to a position substantially close to reducing apparatus 500 and stopped. The reducer 514 of the reducing apparatus 500 can be moved vertically and/or horizontally at the weld joint 1100 to reduce overweld portion 1102.

Once the overweld portion 1102 has been reduced, the continuous strip 155, including the weld joint 1100, can be sent to any suitable apparatus in system 100. In various embodiments, the continuous strip 155, including the weld joint 1100, can be sent to inverting apparatus 600. In various embodiments, a pinch roller 550 may be positioned after reducing apparatus 500 which can pull the continuous strip from the reducing apparatus 500 and send the continuous strip 155 to the next apparatus in system 100. In various embodiments, pinch roller 550 can send the continuous strip to inverting apparatus 600.

Figure 14:
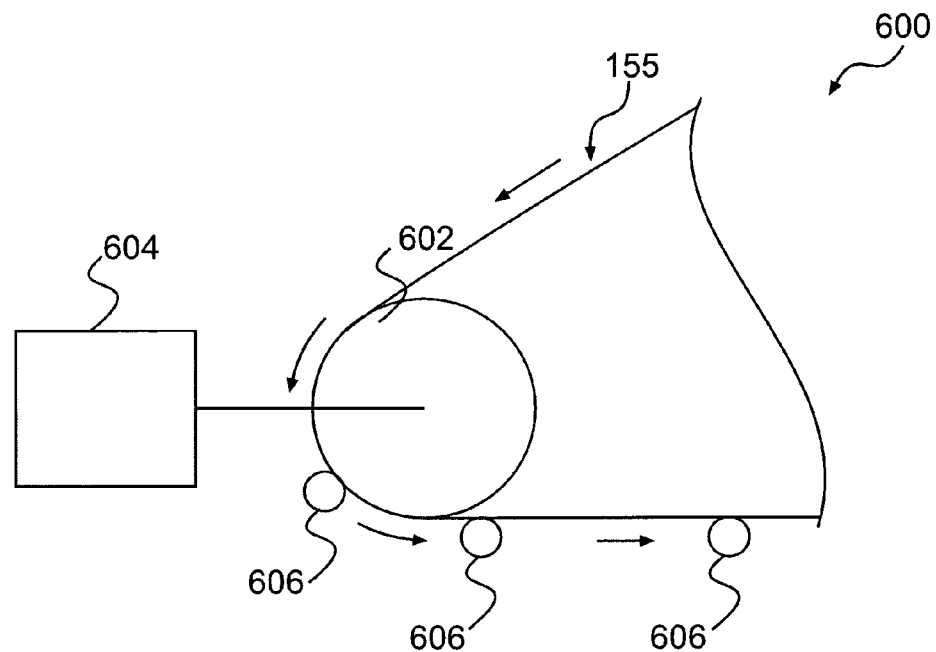
FIG. 14 is a representation of an inverting apparatus according to various embodiments of the present invention.

FIG. 14 shows inverting apparatus 600 according to various embodiments. Inverting apparatus 600 can be any suitable apparatus configured to invert the continuous strip 155, including, but not limited to, a drum, accumulator, looper, etc. In various embodiments, inverting apparatus 600 can include a drum 602, a motor 604, and a plurality of rollers 606. Drum 602 can be any suitable size. In various embodiments, drum 602 can be sized based on the thickness of the width of the continuous strip 155. Motor 604 can be any suitable motor, including, but not limited to, ac motors, dc motors, constant torque motors, etc. Additionally, motor 604 may rotate drum 602 at any suitable rate. Additionally, drum 602 can be moved to modify the tension of the continuous strip 155 being fed thereto. In operation, the continuous strip 155 may revolve around drum 602 such that the weld joint 1100 is inverted. In various embodiments, weld joint 1100 may be inverted 180 degrees, i.e., the top becomes the bottom and the bottom becomes the top. When being inverted by inverting apparatus 600, the continuous strip 155 does not undergo any reverse bending. That is to say, the continuous strip 155 is rotated around the drum such that it bends in the same direction as the bend direction of the strips in their coiled configuration. Additionally, in inverting the continuous strip 155, including the weld joint 1100, inverting apparatus 600 may provide a compression force at weld joint 1100. For example, inverting apparatus 600 may exact a compressing force between rollers 606 and drum 602 on the continuous strip 155. Moreover, the continuous strip 155 may be inverted without a substantial tearing or tensile load being applied to the continuous strip 155.

Figure 15:
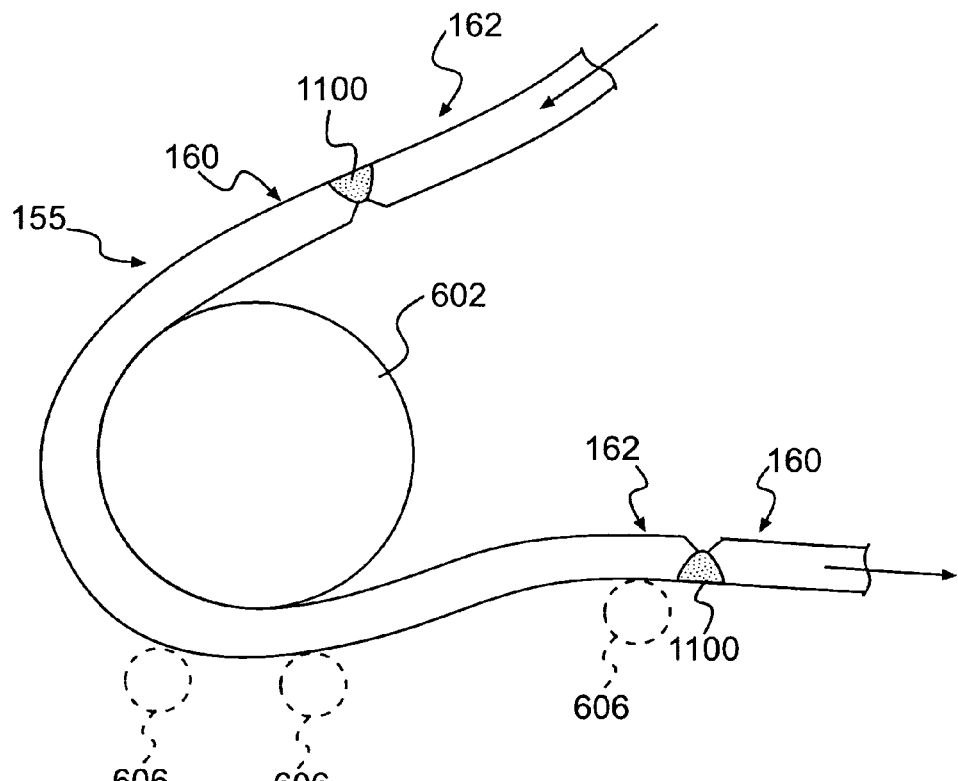
FIG. 15 shows the strips, including the weld joints, being inverted according to various embodiments of the present invention.

FIG. 15 illustrates the inverting apparatus 600 inverting the continuous strip 155. The arrows represent the direction of travel of the continuous strip 155. As can be seen, before being inverted by inverting apparatus 600, the welded side of the weld joint 1100 can face substantially upward and the side that was not welded can face substantially downward so that this side contacts an outer surface of drum 602. As the continuous strip is fed around drum 602, the continuous strip can be inverted. After being inverted, the welded side of the weld joint 1100 can face substantially downward and the unwelded side of the weld joint 1100 can face substantially upward.

The continuous strip 155 may then be sent to any suitable apparatus in system 100. In various embodiments, the continuous strip 155 may be sent to second welding apparatus 800. In various embodiments, the continuous strip 155 may be moved to second welding apparatus 800 by conveying apparatus 700. FIG. 1 shows an example of conveying apparatus 700 according to various embodiments. Conveying apparatus 700 can be any suitable apparatus for moving the continuous strip 155 from inverting apparatus 600 to second welding apparatus 800. For example, conveying apparatus 700 can include, but is not limited to including, trolleys 702, rollers 704, etc. Additionally, in various embodiments, the continuous strip 155 may be pulled by pinch rollers 750.

Figure 16:
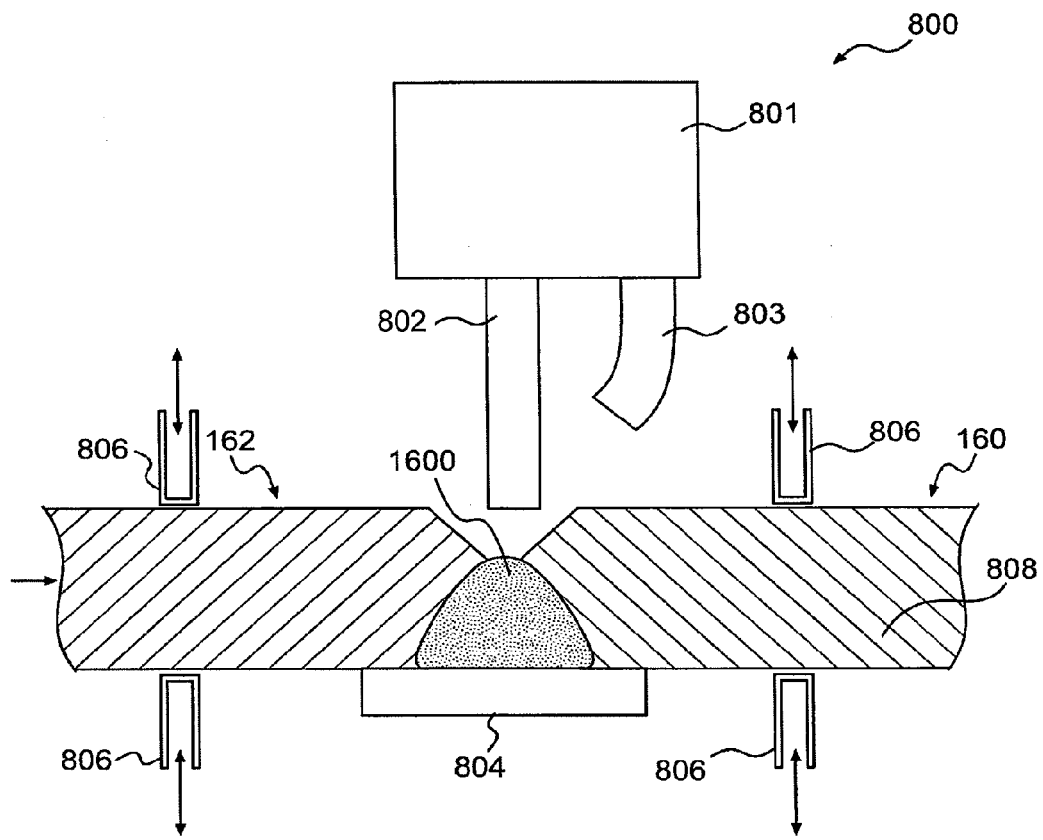
FIG. 16 is a representation of a second welding apparatus and an inverted weld joint being positioned thereat according to various embodiments of the present invention.

FIG. 16 shows second welding apparatus 800 according to various embodiments. Second welding apparatus 800 can be substantially the same as first welding apparatus 400. Second welding apparatus 800 can be any suitable means by which a trailing end and a leading end of successive strips 150 can be welded together. Leading and trailing ends can be welded together by any suitable method, including, but not limited to, gas metal arc welding, TIG welding, flux cored arc welding (FCAW), submerged arc welding (SAW), plasma arc welding, etc. Second welding apparatus 800 can include a welder 801, holding apparatuses 806, and a back-plate 804, which can be made of any suitable material, including, but not limited to, copper, etc.

Holding apparatuses 806 can be any suitable holding apparatus. In various embodiments, holding apparatuses 806 can include a pair of holding apparatus for each end 160, 162. Pairs of holding apparatuses 806 can be configured to contact opposite sides of strip ends 160, 162 to hold the respective strip ends 160, 162 at desired positions with respect to each other in second welding apparatus 800. In various embodiments, for example, holding apparatuses 806 can be clamps that strip ends 160, 162 to back plate 804. Strip ends 160, 162 can be positioned with respect to each other at any suitable distance. In various embodiments, the strip ends 160, 162 can be positioned against each other. Alternatively, the strip ends 160, 162 can be positioned adjacent each other. Once the ends are positioned substantially against or adjacent each other, holding apparatuses 806 can be activated to hold the strip ends 160, 162 in place.

As can be seen from the arrows with each holding apparatus 806, the holding apparatuses 806 can move to release and contact the associated strip end 160, 162. Holding apparatuses 806 can be moved by any suitable means, including, but not limited to, motors, actuators, manually, etc. Moreover, holding apparatuses 806 can be actuated by an automatic command from a sensor, such as, but not limited to, an optical device, a laser, etc.

Welder 801 can weld by any suitable method, including, but not limited to the methods listed above. In various embodiments, welder 801 can be a submerged arc welding apparatus of any suitable configuration. Welder 801 can work in cooperation with at least a flux feeder 803, which can supply flux, and at least one welding wire 802, which can supply the arc. Submerged arc welding and apparatuses for performing submerged arc welding are known in the art and a substantial description thereof will not be provided. In various embodiments, welder 801 of second coupling apparatus 800 welds weld joint 1600. In various embodiments, welder 801 can be positioned above weld joint 1600 and can weld, from above, the weld joint 1600 at its unwelded side. In various embodiments, the welding may be performed from the top under full visual control.

Figure 17:
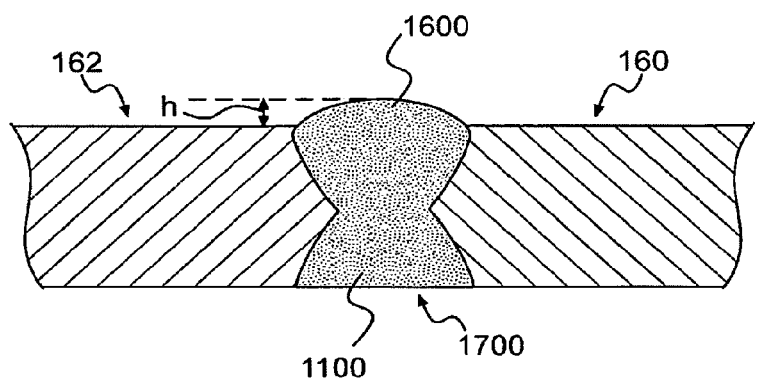
FIG. 17 shows a second overweld portion formed at the weld joint according to various embodiments of the present invention.

FIG. 17 shows a weld junction 1700 of weld joint 1100 and weld joint 1600 after being welded by second welding apparatus 800. The welding process can form weld metal of any suitable amount at weld joint 1600. For example, the weld metal may overlap the first weld metal at the root face. Additionally, the welding process may form overweld portion 1602 on the top surface of the strips at the weld joint 1600. Overweld portion 1602 can be any suitable form, including, but not limited to, a weld bead. Further, overweld portion 1602 can project above the surface of the strips 150 to any suitable height h (measured from surface of strips). For example, overweld portion 1602 can project above the surface of the strips 150 to a height of about 1 mm to about 2 mm.

After second welding apparatus 800 welds the unwelded side of the weld joint 1600, the continuous strip 155 may be sent to any suitable apparatus of system 100. In various embodiments, the continuous strip may be sent to second reducing apparatus 900. Second reducing apparatus 900 can be any suitable reducing apparatus, including, but not limited to, a reducing apparatus substantially similar to first reducing apparatus 500. Similar to first reducing apparatus 500, second reducing apparatus 900 can be used to reduce the height h of overweld portion 1602 if it is determined that the height h is not within predetermined specifications. The height h of overweld portion 1602, as well the determination that the height h is not within predetermined specifications, can be determined by any suitable means including, but not limited to, checking by any suitable optical apparatus, visually checking by a human, etc.

The overweld portion 1602 can be reduced by any suitable amount. In various embodiments, the overweld portion 1602 can be reduced or "trimmed" to substantially the same level as the surfaces of strip ends 160, 162. In various embodiments, reducer 514, such as shown in FIG. 12, can be moved with respect to the overweld portion 1602 to reduce the overweld portion 1602 a desired amount or to a predetermined height within predetermined specifications. Alternatively, reducer 514 can be substantially stationary with respect to the X-Y-Z axis, and the continuous strips (including the overweld portion 1602) can be moved with respect to reducer 514 to reduce overweld portion 1602.

Figure 18A:
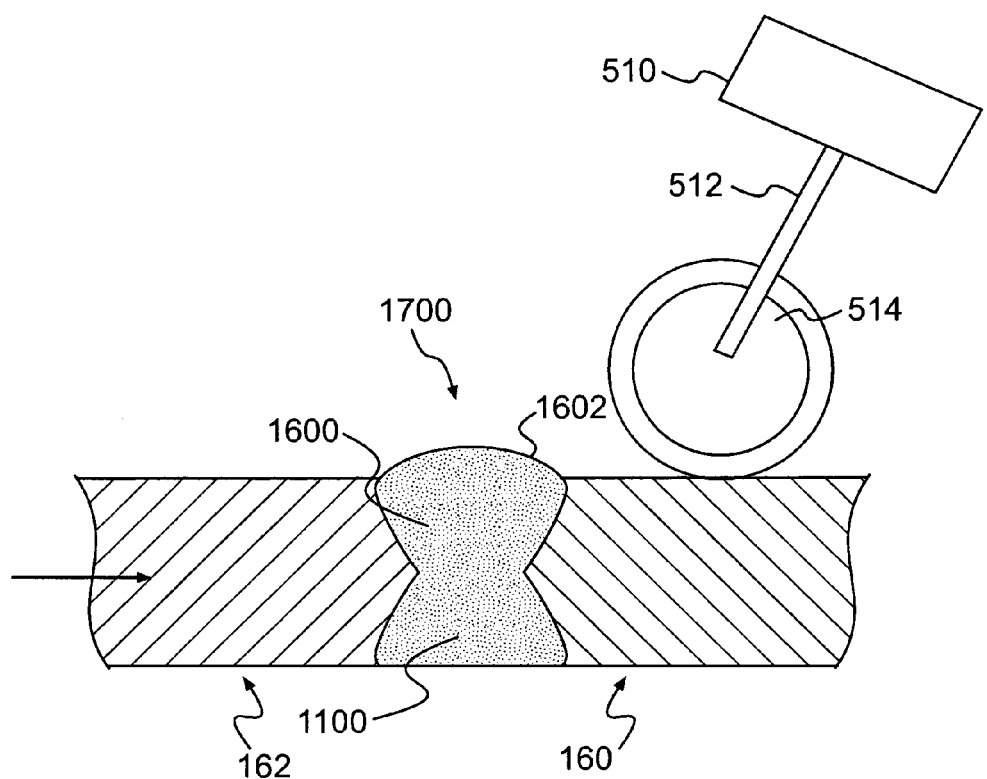
FIG. 18A shows a second overweld portion being supplied to second reducing apparatus according to various embodiments of the present invention.
Figure 18B:
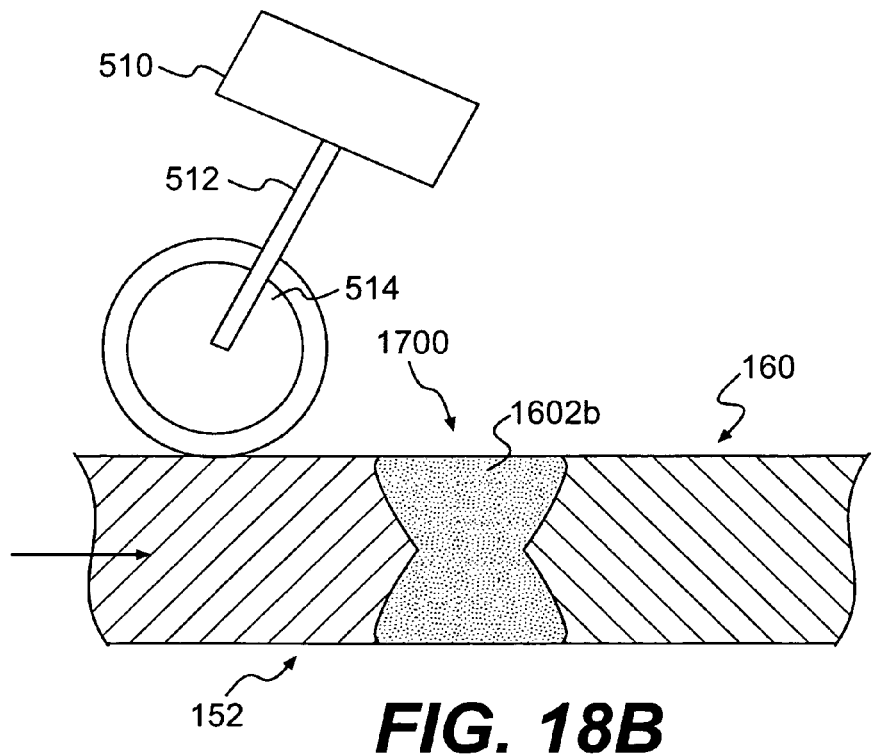
FIG. 18B shows the weld joint after subjecting the second overweld portion to the second reducing apparatus according to various embodiments of the present invention.

FIGS. 18A and 18B respectively show the overweld portion 1602 before and after being reduced by second reducing apparatus 900. As can be seen from FIG. 18A, overweld portion 1602 has a height h above the surfaces of trailing and leading ends 160, 162. The right-going arrow in FIGS. 18A and 18B represents the direction of movement of the weld joint 1600 with respect to reducer 514 of the second reducing apparatus 900. Reducer 514 may be in a substantially fixed position or may be movable to reduce the overweld portion 1602 a desired amount. In various embodiments, reducer 514 may rotate, at any suitable rate, to reduce overweld portion 1602 from a height h.

FIG. 18B shows the weld joint 1600, which has passed reducer 514, with a reduced overweld portion 1602b. In various embodiments, reduced overweld portion 1602b can be at substantially the same level as the surfaces of trailing and leading ends 160, 162. Alternatively, the weld joint 1600 can be brought to a position substantially close to second reducing apparatus 900. The reducer 514 of the second reducing apparatus 900 can be moved vertically and horizontally at the weld joint 1600 to reduce overweld portion 1602.

After being exposed to second reducing apparatus 900, the continuous strip 155 can be sent to any suitable apparatus in system 100. In various embodiments, the continuous strip can be sent to testing apparatus 1000.

FIG. 19 shows a top view of testing apparatus 1000 according to various embodiments. Testing apparatus 1000 can be any suitable apparatus configured to test the weld seam at weld junction 1700. For example, testing apparatus 1000 can include, but is not limited to, an ultrasonic testing apparatus, an X-ray testing apparatus, etc. Testing apparatus 1000 may include one or more probes 1002 that can test the integrity of the weld at the weld junction 1700. In various embodiments, the weld junction 1700 is moved to testing apparatus 1000, whereupon the one or more probes 1002 can be moved along the weld junction 1700 to test the integrity of the weld. One or more probes 1002 can be configured in testing apparatus 1000 so that both sides of weld junction 1700 can be tested. For example, the weld junction 1700 may be moved, as indicated in FIG. 19 by the right-going arrow, into testing apparatus 1000. Once weld junction 1700 is appropriately positioned with respect to testing apparatus 1000, probes 1002 may be moved perpendicularly with the right-going arrow along the weld junction 1700. In various embodiments, weld junction 1700 is tested before being sent to pipe making apparatus 1200.

After being tested, the continuous strip 155 can be supplied to any suitable apparatus in system 100. In various embodiments, the continuous strip 155 can be supplied to pipe forming apparatus 1200. Continuous strip 155 can be supplied to pipe forming apparatus 1200 with the aid of a traveling wagon 1150 (as shown in FIG. 1). Traveling wagon 1150 may be synchronized with pipe forming apparatus 1200. Additionally, traveling wagon 1150 may move by any suitable means, including, but not limited to, rails with or without a rack and a pinion.

Figure 20:
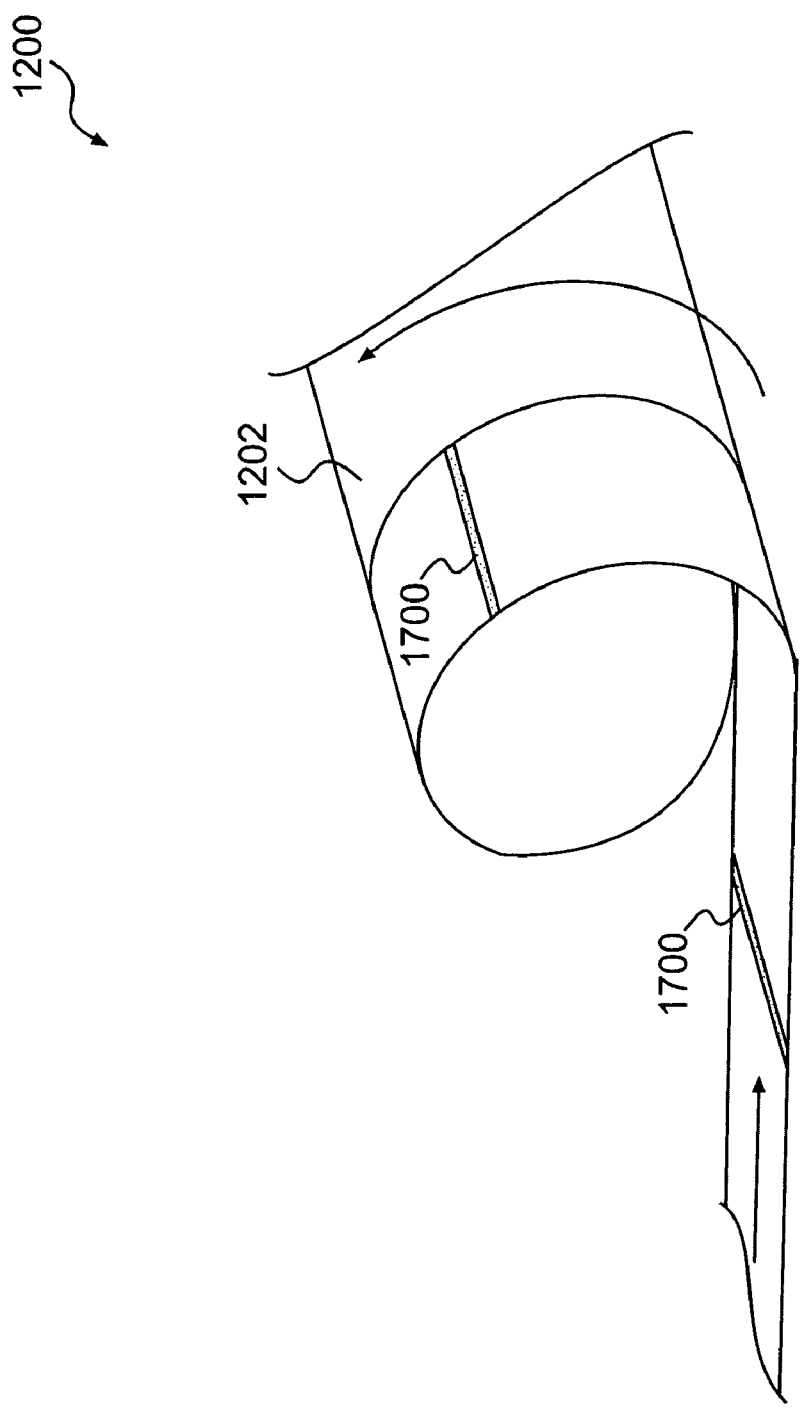
FIG. 20 is a representation of a pipe making apparatus according to various embodiments of the present invention.

FIG. 20 shows pipe forming apparatus 1200 according to various embodiments. Pipe forming apparatus 1200 can be any suitable apparatus for forming a pipe from the continuous strip 155, including, but not limited to, a spiral pipe forming apparatus, an ERW (API) pipe forming apparatus, etc. For example, pipe forming apparatus 1200 can be substantially the same as described in U.S. Pat. No. 4,645,893, the entirety of which is hereby incorporated by reference. The continuous strip 155 having weld joints 1700 can be supplied to pipe forming apparatus 1200 as indicated by the right-going arrow. Pipe forming apparatus 1200 may rotate to form pipe 1202 from the continuous strip 155 being supplied thereto. Pipe forming apparatus 1200 may rotate one of clockwise or counterclockwise to form pipe 1202. In various embodiments, pipe forming apparatus 1200 rotates in a direction that will not create a reverse bend in the continuous strip 155.

Figure 21:
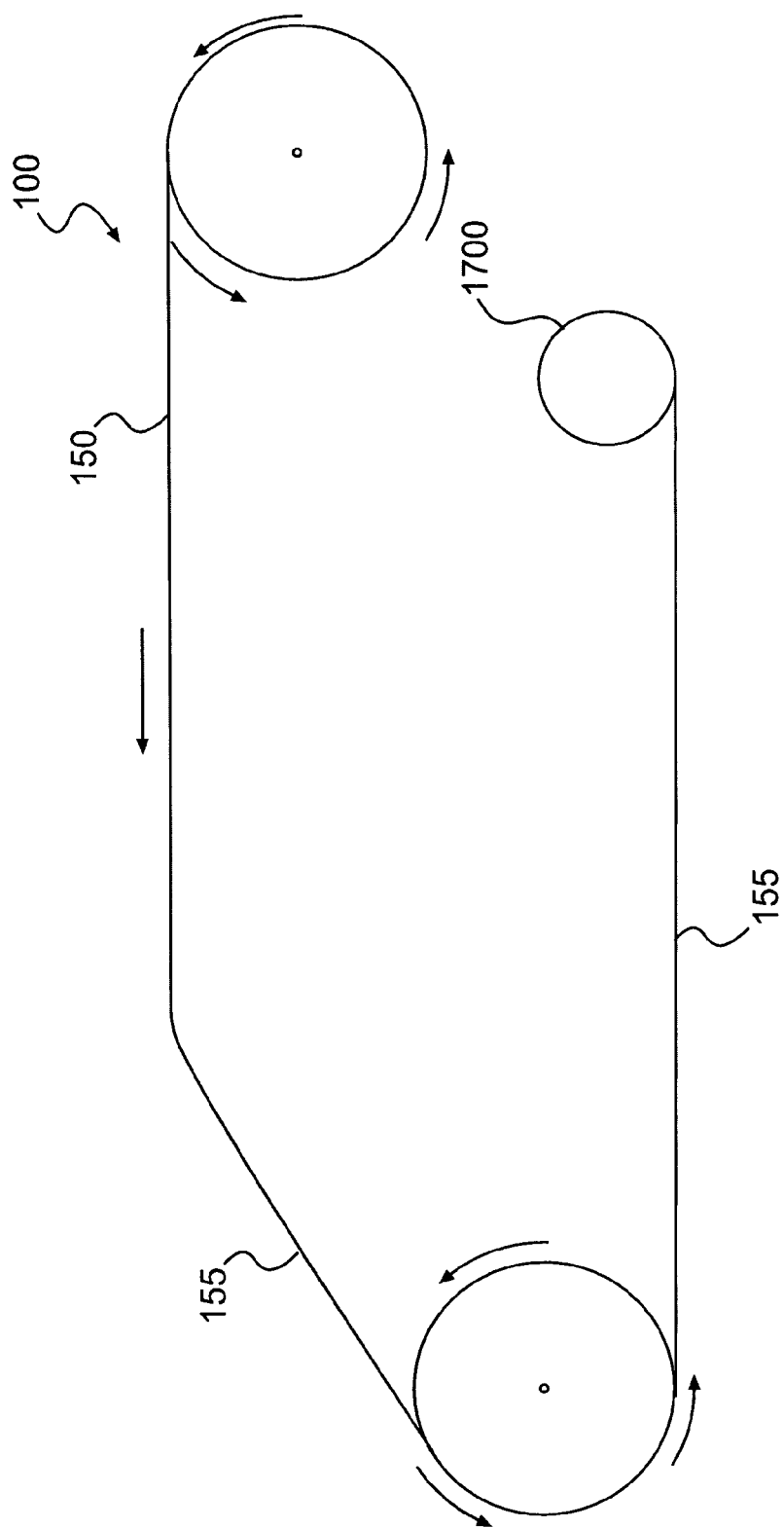
FIG. 21 is a general representation of the system that forms a spiral pipe without creating a reverse bend in the welded-together strips of the present invention.

FIG. 21 shows generally how system 100 creates a pipe 1202 from continuous strip 150 without creating a reverse bend in the continuous strip. In various embodiments, each strip 150 can be uncoiled from a first bend direction. In FIG. 21, for example, the bend direction is counterclockwise. Adjacent strips 150 are welded together at first welding apparatus 400 to form the continuous strip 155. The continuous strip 155 may then be supplied to inverting apparatus 600. Inverting apparatus 600 may invert the continuous strip 155 such that the side of the strip, including the weld joint, that faced upward during the first welding operation now faces downward, and so the side of the strip that faced downward during the first welding operation now faces upward. In doing so, the continuous strip 155 is rotated around drum 602, again in a counterclockwise direction, thereby inverting the continuous strip 155 by bending it only in the first bend direction. The continuous strip 155 may then be sent to pipe forming apparatus 1200 to form pipe 1202. Pipe forming apparatus 1200 may rotate in a counterclockwise direction to form the pipe, thereby bending the continuous strip 155 in the first bend direction and preventing a reverse bend in the continuous strip.

Figure 22:
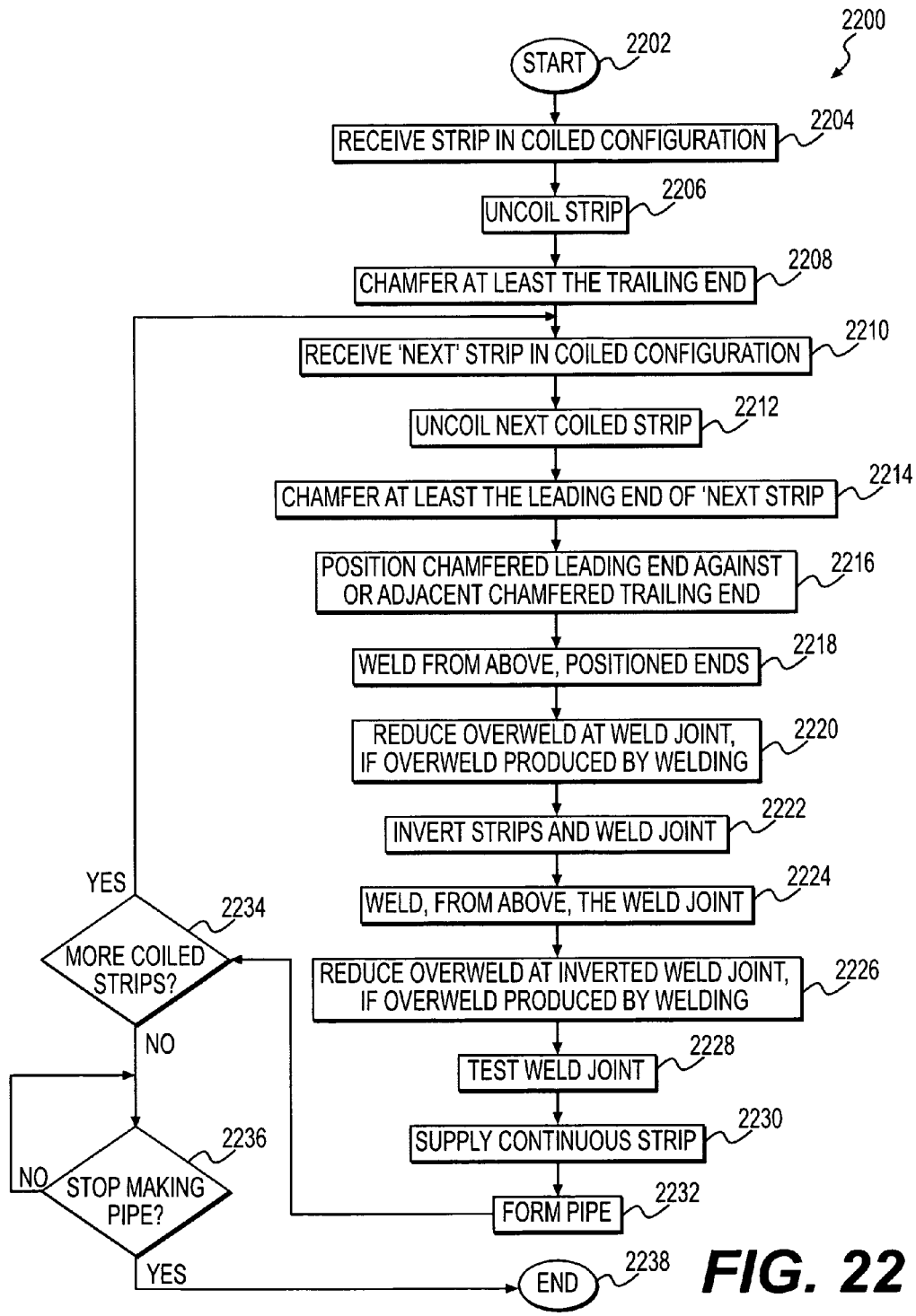
FIG. 22 is a flow chart of a method of manufacturing a pipe from a continuous strip/plate of material according to various embodiments of the present invention.

FIG. 22 shows a method according to various embodiments. The method may be implemented by any suitable means, including, but not limited to the apparatuses recited herein. Additionally, the method can be controlled by any suitable means, including, but not limited to, a computer, a processor, one or more humans, etc. The method may start (2202) and then system 100 can receive (2204) a strip in a coiled configuration having a bend direction. In various embodiments, the strip in the coiled configuration can be received by uncoiling apparatus 200. An empty uncoiling apparatus 200 can move to position 202(2) to receive the strip in the coiled configuration, and uncoiling apparatus 200 can then move to position 202(1).

The method may uncoil (2206) the strip from the coiled configuration. In various embodiments, uncoiling apparatus 200 can be used to uncoil (2206) the strip from the coiled configuration. The strip can be uncoiled (2206) from a top position of the coiled configuration, with the leading end being fed before the trailing end. Furthermore, the strip can be uncoiled (2206) from a top position by being rotated one of clockwise or counterclockwise. The uncoiled strip can be sent to edge forming apparatus 300.

The strip can be sent to edge forming apparatus 300 by any suitable means, including, but not limited to, by feed rollers, etc. In various embodiments, the strip can be received by pinch roller and leveler apparatus 250 before being sent to edge forming apparatus 300. Additionally, center guides 175 may be used to position and align the strip appropriately at edge forming apparatus 300. As the strip 150 is being received by edge forming apparatus 300, the end of the strip 150 to be formed is monitored so that it can be accurately positioned at edge forming apparatus 300. Any suitable means may be used to monitor the end, including, but not limited to, lasers, optical devices, etc. When it is determined that the end of the strip is appropriately positioned at edge forming apparatus 300, the strip end to be formed may be held in a stationary position. In various embodiments, holding apparatuses 306 can move to hold the strip end. For example, holding apparatuses 306 may hold the strip end against discarding apparatuses 310, 312. Once the end of the strip is appropriately positioned and held in a stationary position at edge forming apparatus 300, the method may continue and chamfer (2208) at least the trailing end of the strip. For example, in the method, if the strip is the first strip to be used in forming the continuous strip, only the trailing end may be chamfered (2208). However, if the strip is a "middle" strip of the continuous strip, both leading and trailing ends may be chamfered. If both ends are to be chamfered, the leading end, generally, will be chamfered before the trailing end. In various embodiments, edge forming apparatus 300 can perform the chamfering (2208). For the first strip, the chamfering (2208) may include forming an 'X' chamfer on only the trailing end of the strip. The 'X' chamfer can be any suitable dimensions. Additionally, forming the 'X' chamfer may include making a 'Y' cut (that may include discarding a scrap end) and making a 'V' cut in the strip end to produce the final 'X' chamfer. In various embodiments, cutting apparatus 304 may make the 'Y' cut and chamfering apparatus 308 may chamfer the end to produce the final 'X' chamfer. Additionally, the appropriate discarding apparatus 310, 312 can be used to discard a scrap end remaining after the 'Y' cut. In various embodiments, discarding apparatuses 310, 312 may work in cooperation with the associated holding apparatus 306. For example, the corresponding holding apparatus 306 may release the scrap end at substantially the same time that discarding apparatus 310, 312 operates to discard the scrap end. The strip may then be released from being restrained and sent to first welding apparatus 400.

In FIG. 22, the method may continue and receive (2210) a 'next' strip in a coiled configuration. In various embodiments, the 'next' strip in the coiled configuration can be received (2210) at uncoiling apparatus 200 substantially as described above for the first strip. Though FIG. 22 shows the 'next' strip being received (2210) after chamfering (2208) the trailing end, receiving (2210), the 'next' strip may occur substantially at the same time that the chamfering (2208) is performed. More specifically, the 'next' strip can be received (2210) at uncoiling apparatus 200 at substantially the same time that a previously uncoiled strip is being chamfered (2208) at forming apparatus 300. The 'next' strip can be uncoiled (2212) substantially as described above for uncoiling (2206) the first strip, and the method may then chamfer (2214) at least the leading end of the 'next' strip. For example, if the 'next' strip is the last strip to be used in forming the continuous strip, only the leading end may be chamfered (2214). However, if the 'next' strip is a "middle" strip of the continuous strip, both leading and trailing ends may be chamfered (2214). If both ends are to be chamfered, the leading end, generally, will be chamfered (2214) before the trailing end. In various embodiments, edge forming apparatus 300 can perform the chamfering substantially as described above for chamfering (2208) the first strip with an 'X' chamfer. After at least the leading end of the 'next' strip is chamfered, the 'next' strip can be released from being restrained and received by first welding apparatus 400.

The method may continue and position (2216) the leading end of the 'next' strip against the trailing end of the first strip. Alternatively, the leading end of the 'next' strip can be positioned (2216) adjacent the trailing end of the first strip. Trailing and leading ends may also be aligned with respect to one another. Aligning of the trailing and leading ends may be performed by any suitable means. In various embodiments, one or more of guides 175 and a detecting apparatus, such as a laser or optical detector, can be used to appropriately position (2216) and align the trailing end of the strip with respect to the leading end of the 'next' strip. Once the ends are appropriately positioned (2216) and aligned with respect to each other and the first welding apparatus 400, the ends can be held in place. In various embodiments, holding apparatuses 406 can move to hold the ends in place. Once the ends are positioned (2216), aligned, and held in place, the method may weld (2218) the ends together from above.

In FIG. 22, the ends can be welded (2218) together by any suitable means, thereby producing a weld joint. In various embodiments, the ends can be welded (2218) from above by first welding apparatus 400. The welding process (2218) can allow for weld metal to be formed at the weld joint in any suitable configuration and amount. In various embodiments, the welding process (2218) may allow for the root face of the chamfered strip ends to be covered by weld metal. For example, about 80% of the root face may be covered by weld metal. Additionally, the welding process (2218) may produce overweld portion 1102 at the weld joint. Overweld portion may take any suitable form, including, but not limited to a weld bead. Overweld portion 1102 may project above the surface of the strips to any height. For example, overweld portion 1102 can project above the surface of the strips to a height of in the range of about 1 mm to about 2 mm. Also, the welding process (2218) may leave an unwelded portion on the opposite side of the weld joint. Once the weld joint is formed by welding (2218), the strips, which may now be labeled as the continuous strip 155, can be released from being held and sent to first reducing apparatus 500.

In FIG. 22, the method may continue, and, if the welding process (2218) produces an overweld portion 1102, the overweld portion may be reduced (2220). It may be determined that the weld joint includes an overweld portion 1102 by any suitable means, including, but not limited to, by visual inspection, laser detection devices, optical detection devices, etc. The overweld portion 1102 can be reduced (2220) by any suitable means, including, but not limited to, by grinding, shaving, etc. In various embodiments, a weld joint that includes an overweld portion can be received by first reducing apparatus 500, which can reduce (2220) overweld portion 1102 by any suitable amount. For example, overweld portion 1102 can be reduced (2220) to be at substantially the same level as the strips. Once the overweld portion has been reduced an appropriate amount, the continuous strip 155 may be sent to inverting apparatus 600. In various embodiments, the continuous strip 155 can be sent to pinch roller 550 before being sent to inverting apparatus 600.

The method may continue, and the continuous strip 155, including the weld joint, can be inverted (2222). The continuous strip 155 can be inverted (2222) in any suitable manner and by any suitable means. For example, the continuous strip 155 can be inverted (2222) 180 degrees. Additionally, in various embodiments, the continuous strip 155 (and weld joint) can be inverted (2222) such that a reverse bend is not formed in the continuous strip. In various embodiments, inverting apparatus 600 can invert (2222) the continuous strip 155. Further, inverting apparatus 600 can invert (2222) the continuous strip 155 such that a reverse bend is not formed in the continuous strip 155. For example, the continuous strip 155 may be revolved around drum 602 of inverting apparatus 600 such that the continuous strip 155 bends in the same direction in which each of the strips was coiled. Once the continuous strip 155 has been inverted (2222), the continuous strip 155 can be supplied to second welding apparatus 800. The continuous strip 155 can be supplied to second welding apparatus 800 by any suitable means. In various embodiments, conveying apparatus 700 may supply the continuous strip 155 to second welding apparatus 800. Also, the continuous strip 155 may be received by pinch roller 750 before being sent to second welding apparatus 800.

In FIG. 22, the method may continue and weld (2224) the weld joint from above, on the unwelded side. The welding (2224) can be substantially the same as described above for welding (2218) the first side with welding apparatus 400. Additionally, second welding apparatus 800 can perform the welding (2224). The weld metal of the second welding (2224) may overlap the weld metal of the first welding (2218), including at the root face. Additionally, an overweld portion may be formed at the weld joint. The overweld portion can be substantially the same as discussed above. Once the weld joint is welded (2224), the continuous strip 155 can be released from being held and sent to second reducing apparatus 900.

The method may continue and, if the welding process (2224) produces an overweld portion, the overweld portion may be reduced (2226). It may be determined that the weld joint includes an overweld portion by any suitable means, including, but not limited to, by visual inspection, laser detection devices, optical detection devices, etc. The overweld portion can be reduced (2226) by any suitable means, including, but not limited to, by grinding, shaving, etc. In various embodiments, a weld joint that includes an overweld portion can be received by second reducing apparatus 900 to reduce (2226) the overweld portion. Second reducing apparatus 900 can reduce (2226) the overweld portion by any suitable amount. For example, the overweld portion can be reduced (2226) to be at substantially the same level as the continuous strip 155. Once the overweld portion has been reduced (2226) an appropriate amount, the continuous strip 155 may be sent to testing apparatus 1000.

In FIG. 22, the method may continue, and the weld joint may be tested (2228) by any suitable means and method. In various embodiments, testing apparatus 1000 may test (2228) the weld joint. Additionally, the testing (2228) may be any suitable testing, including, but not limited to, ultrasonic testing, X-ray testing, etc. Furthermore, the weld joint may be tested (2228) from above and/or below. Once the weld joint has been tested (2228), the continuous strip 155 may be supplied (2230) to pipe forming apparatus 1200 by any suitable means and method. For example, the continuous strip 155 may be supplied (2230) to pipe forming apparatus 1200 using traveling wagon 1150. The continuous strip 155 may be supplied either continuously or semi-continuously to pipe forming apparatus 1200, which may form (2232) a pipe from the continuous strip 155.

In the method, the pipe is formed (2232) from the continuously or semi-continuously supplied continuous strip by any suitable method. For example, pipe forming apparatus 1200 may employ a spiral technique to form (2232) the pipe.

The method may continue to determine (2234) whether more strips are to be uncoiled to form the continuous strip 155. Any suitable means may be used to determine whether more strips are to be used. If it is determined that more strips are to be used to form the continuous strip 155, the method may receive another strip (2204). Furthermore, though the determination (2234) as to whether more strips are to be uncoiled to form the continuous strip 155 is shown as following formation of the pipe (2232), the determination may be made at any suitable time or place in the method, thereby allowing for either continuous or semi-continuous formation (2208-2228) of the continuous strip and either continuous or semi-continuous supply of the continuous strip (2230) for the formation of the pipe (2232).

If it is determined (2234) that there are no more strips to be used to form the continuous strip 155, the method may determine (2236) whether or not to stop making pipe by, for example, whether determining a specified amount of continuous strip 155 has been supplied (2230) to pipe forming apparatus 1200 and/or determining whether a specified length of pipe has been formed (2232). If it is determined (2236) that either the specified amount of continuous strip has not been supplied (2230) or the specified length of pipe has not been formed (2232), the method may continue supplying (2230) the continuous strip 155 to pipe forming apparatus 1200 so that pipe forming apparatus continue 1200 can forming (2232) the pipe. If it is determined (2236) that either the specified amount of continuous strip 155 has been supplied (2230) or the specified length of pipe has been formed (2232), the method may end (2238).

Thus, as has been described in the preceding two paragraphs, further strips in coiled configurations can be successively received and uncoiled by uncoiling apparatus 200, edge formed by edge forming apparatus 300, welded to immediately preceding and following strips by first welding apparatus 400, inverted by inverting apparatus 600, welded by second welding apparatus 800, received at pipe forming apparatus 1200, and used to form a pipe by pipe forming apparatus 1200. The method may be applied to any suitable number of strips to form the continuous strip.

Figure 23:
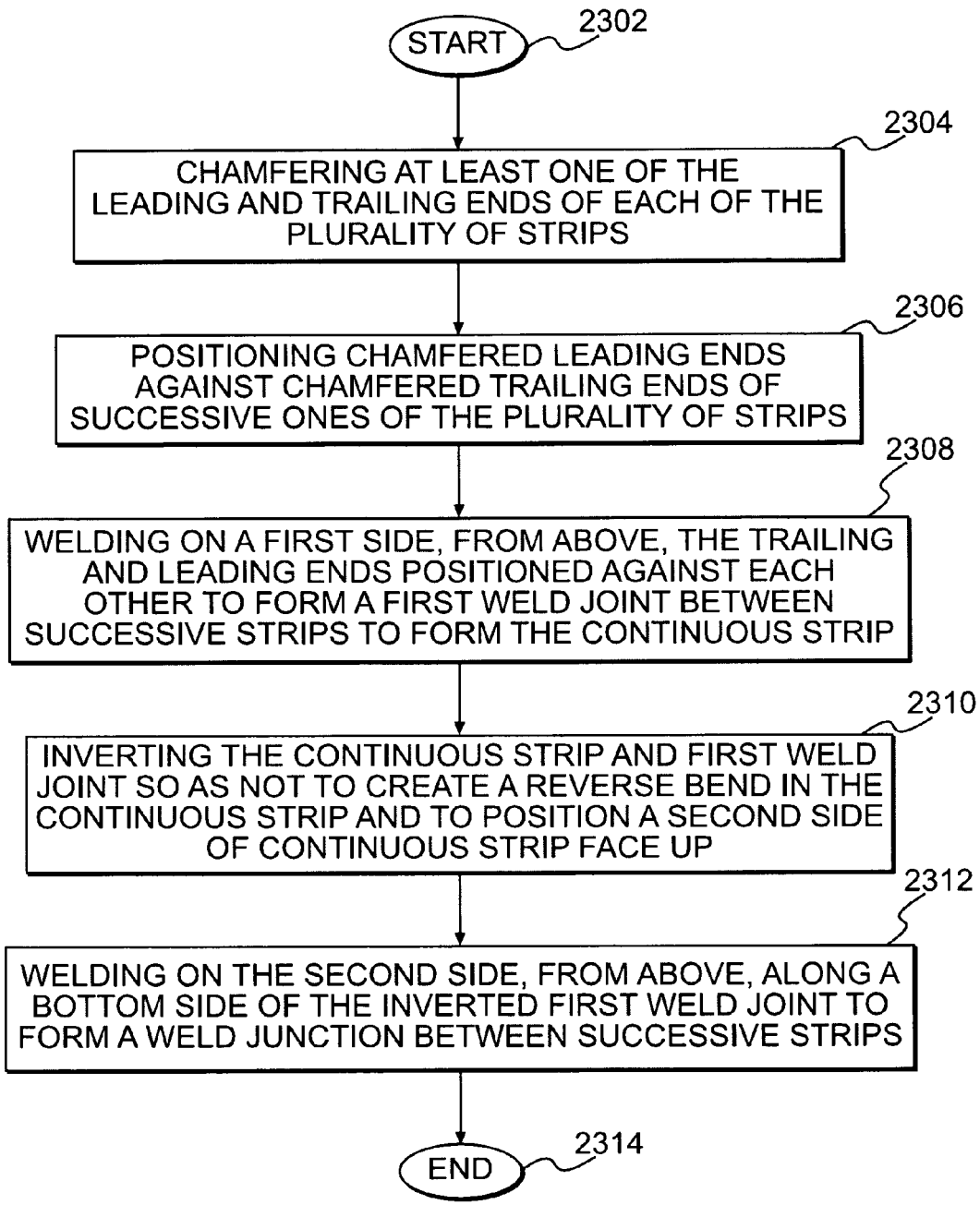
FIG. 23 is a flow chart of a method of forming a continuous strip from a plurality of strips according to various embodiments of the present invention.

FIG. 23 shows a method of forming a continuous strip from a plurality of strips, each of the plurality of strips having a leading end and a trailing end, according to various embodiments of the present invention. The method may be implemented by any suitable means, including, but not limited to the apparatuses recited herein. Additionally, the method can be controlled by any suitable means, including, but not limited to, a computer, a processor, one or more humans, etc. The method may start (2302) and continue to chamfer (2304) at least one of the leading and trailing ends of each of the plurality of strips. For example, in the method, if the strip is the first strip to be used in forming the continuous strip 155, only the trailing end of the first strip may be chamfered (2304). However, if the strip is a "middle" strip of the continuous strip 155, both leading and trailing ends may be chamfered (2304). If both ends are to be chamfered (2304), the leading end, generally, will be chamfered (2304) before the trailing end. In various embodiments, edge forming apparatus 300 can perform the chamfering (2304).

In FIG. 23, the method may continue to position (2306) chamfered leading ends against chamfered trailing ends of successive ones of the plurality of strips. Any suitable means may be used to position (2306) chamfered leading and trailing ends of successive strips. In various embodiments, one or more of guides 175 and a detecting apparatus, such as a laser or optical detector, can be used to position (2306) the leading ends against chamfered trailing ends of successive strips.

In FIG. 23, the method may continue to weld on a first side (2308), from above, the trailing and leading ends that are positioned against each other to form weld joints. The welding (2308) can be performed by any suitable means, to thereby produce a weld joint. Once welded (2308), the welded-together strips may now be labeled as continuous strip 155. In various embodiments, the ends can be welded on a first side (2308), from above, by first welding apparatus 400. The welding process (2308) can allow for weld metal to be formed at the weld joint in any suitable configuration and amount. In various embodiments, the welding process (2308) may allow for the root face of the chamfered strip ends to be covered by weld metal. For example, about 80% of the root face may be covered by weld metal. Additionally, the welding process (2308) may produce overweld portion 1102 at the weld joint. Overweld portion may take any suitable form, including, but not limited to a weld bead. Overweld portion 1102 may project above the surface of the strips to any height. For example, overweld portion 1102 can project above the surface of the strips to a height of in the range of about 1 mm to about 2 mm. Also, the welding process (2308) may leave an unwelded portion on the opposite side of the weld joint.

The method may continue to invert (2310) the weld joints so as not to create a reverse bend in the continuous strip 155. The continuous strip 155 can be inverted (2310) in any suitable manner and by any suitable means. For example, the continuous strip 155 can be inverted (2310) 180 degrees. Additionally, in various embodiments, the continuous strip 155 (and weld joints) can be inverted (2310) such that a reverse bend is not formed in the continuous strip 155. In various embodiments, inverting apparatus 600 can invert (2310) the continuous strip 155. Further, inverting apparatus 600 can invert (2310) the continuous strip 155 such that a reverse bend is not formed in the continuous strip 155. For example, the continuous strip 155 may be revolved around drum 602 of inverting apparatus 600 such that the continuous strip 155 bends in the same direction in which each of the strips was coiled.

In FIG. 23 the method may continue and weld (2312) on a second side opposite the first side, from above, the inverted weld joints to form weld junctions. In various embodiments, the weld junction may include the first weld joint and the second weld joint. The welding (2312) can be substantially the same as described above for welding (2308) the first side. In various embodiments, second welding apparatus 800 can perform the welding (2312). The weld metal of the second welding (2312) may overlap the weld metal of the first welding (2308), including at the root face. Additionally, an overweld portion may be formed at the weld junctions. After the second welding, the method may end at (2314).

In accordance with an embodiment of the present invention, a method as substantially shown and described herein.

In accordance with an embodiment of the present invention, this can include, for example, a method of forming a continuous strip from a plurality of strips, each of the plurality of strips having a leading end and a trailing end. The method can comprise chamfering at least one of the leading and trailing ends of each of the plurality of strips; positioning chamfered leading ends against chamfered trailing ends of successive ones of said plurality of strips; welding on a first side, from above, the trailing and leading ends positioned against each other to form a first weld joint between successive strips, the welding thereby forming the continuous strip; inverting the continuous strip and first weld joint so as not to create a reverse bend in the continuous strip and to position a second side of continuous strip to face up; and welding on the second side, from above, along bottom side of the inverted first weld joint to form weld a junction between successive strips.

In accordance with another embodiment of the present invention, an apparatus as substantially shown and described herein.

In accordance with another embodiment of the present invention, this can include, for example, an apparatus for forming a continuous strip from a plurality of strips, each strip having a leading end and a trailing end, the apparatus comprising: a forming apparatus to chamfer one or more of the trailing and leading ends of each of the strips; means for positioning chamfered trailing ends against chamfered leading ends of successive ones of the plurality of strips; a first welding apparatus to weld on a first side, from above, the trailing and leading ends positioned adjacent each other to form weld joints, the welding thereby forming the continuous strip; an inverting apparatus to invert the continuous strip and the weld joints so as not to create a reverse bend in the continuous strip; and a second welding apparatus to weld on a second side opposite the first side, from above, the inverted weld joints to form weld junctions.

In accordance with yet another embodiment of the present invention, a system as substantially shown an described herein.

In accordance with yet another embodiment of the present invention, this can include, for example, a system for manufacturing a pipe from a continuous strip/plate of material, the system comprising: means for successively uncoiling a plurality of strips from a coiled configuration, the uncoiling including feeding the leading and trailing ends of each of the plurality of strips from a top position of the coiled configuration; means for 'X' chamfering at least one of the leading and trailing ends of each of the plurality of strips; means for positioning 'X' chamfered trailing ends adjacent 'X' chamfered leading ends of successive ones of the plurality of strips; first welding means for welding on a first side, from above, the 'X' chamfered trailing and leading ends positioned adjacent each other to form a weld joint between successive strips, and thereby forming the continuous strip; means for reducing an overweld portion on the first side; means for inverting the continuous strip and weld joints so as not to create a reverse bend in the continuous strip; second welding means for welding on a second side of the continuous strip, from above, each inverted weld joint to form weld junctions; and means for reducing another overweld portion on the second side.

While the present invention has been described in conjunction with a number of embodiments, the invention is not to be limited to the description of the embodiments contained herein, but rather is defined by the claims appended hereto and their equivalents. It is further evident that many alternatives, modifications, and variations would be or are apparent to those of ordinary skill in the applicable arts. Accordingly, all such alternatives, modifications, equivalents, and variations that are within the spirit and scope of this invention.

What is claimed is:

1. A method of forming a continuous strip from a plurality of strips, each of said plurality of strips having a leading end and a trailing end, the method comprising:
   chamfering at least one of the leading and trailing ends of each of said plurality of strips;
   positioning chamfered leading ends against chamfered trailing ends of successive ones of said plurality of strips;
   welding on a first side, from above, the trailing and leading ends positioned against each other to form a first weld joint between successive strips, said welding thereby forming the continuous strip;
   inverting the continuous strip and first weld joint so as not to create a reverse bend in the continuous strip and to position a second side of continuous strip to face up; and
   welding on the second side, from above, along bottom side of the inverted first weld joint to form weld a junction between successive strips.

2. The method according to claim 1, further comprising:
   successively uncoiling each said strip from a coiled configuration having a first bend direction, said uncoiling including feeding the leading and trailing ends from a top position of the coiled configuration.

3. The method according to claim 2, further comprising:
   before said uncoiling, successively supplying each said strip in its coiled configuration to an uncoiling apparatus.

4. The method according to claim 2, wherein said successively uncoiling includes feeding the leading end of said strip from the coiled configuration before feeding the trailing end of said strip.

5. The method according to claim 1, wherein said chamfering includes:
   forming a 'Y' cut in the at least one leading and trailing ends;
   discarding a scrap end of each end that is 'Y' cut; and
   chamfering each end that is 'Y' cut to form an 'X' chamfer.

6. The method according to claim 1, further comprising:
   reducing an overweld portion at the weld joint, if the overweld portion is produced by said welding on said first side; and
   reducing an overweld portion at the weld joint, if the overweld portion is produced by said welding on said second side.

7. The method according to claim 6, wherein said reducing of the first overweld portion occurs before said reducing of the second overweld portion.

8. The method according to claim 6, wherein said reducing of the first overweld portion occurs before said welding of the second side of the inverted weld joint.

9. The method according to claim 1, further comprising:
   testing each said weld junction by ultrasonic testing, said testing occurring after said welding, from above, the inverted weld joints.

10. The method according to claim 6, further comprising:
    testing each said weld junction after said grinding the second overweld portion.

11. The method according to claim 1, further comprising:
    forming a pipe using the continuous strip, said forming occurring without creating a reverse bend in the continuous strip.

12. The method according to claim 2, further comprising:
    forming a pipe by spirally welding the continuous strip, the pipe being formed such that the first bend direction of the strips faces the interior of the pipe.

13. The method according to claim 1,
    wherein said welding on the first side, from above, the trailing and leading ends to form the first weld joint is performed by a first welding apparatus; and
    said welding on the second side, from above, along the bottom side of the inverted first weld joint is performed by a second welding apparatus.

* * * * *